United States Patent
Iwamoto et al.

(10) Patent No.: US 7,190,415 B2
(45) Date of Patent: Mar. 13, 2007

(54) DIGITAL BROADCASTING RECEIVER

(75) Inventors: Shinichi Iwamoto, Kobe (JP); Toshitaka Yamato, Kobe (JP); Hideki Kitao, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 547 days.

(21) Appl. No.: 10/232,402

(22) Filed: Sep. 3, 2002

(65) Prior Publication Data
US 2003/0063224 A1 Apr. 3, 2003

(30) Foreign Application Priority Data
Sep. 6, 2001 (JP) ............................ P2001-270827

(51) Int. Cl.
H04N 5/50 (2006.01)
(52) U.S. Cl. ...................................... 348/731
(58) Field of Classification Search ................ 348/731, 348/732, 553, 907, 558; 725/22, 38, 58
See application file for complete search history.

(56) References Cited

U.S. PATENT DOCUMENTS

| | | | | | |
|---|---|---|---|---|---|
| 4,677,466 | A | * | 6/1987 | Lert et al. ....................... | 725/22 |
| 4,857,999 | A | * | 8/1989 | Welsh ........................... | 725/22 |
| 4,918,531 | A | * | 4/1990 | Johnson ........................ | 348/565 |
| 4,979,047 | A | * | 12/1990 | Wine ............................ | 386/108 |
| 5,162,905 | A | * | 11/1992 | Itoh et al. ...................... | 725/22 |
| 5,479,267 | A | * | 12/1995 | Hashimoto ..................... | 386/83 |
| 5,661,526 | A | * | 8/1997 | Hamamoto et al. ............ | 348/465 |
| 5,668,917 | A | * | 9/1997 | Lewine .......................... | 386/52 |
| 5,708,477 | A | * | 1/1998 | Forbes et al. .................. | 348/552 |
| 5,841,940 | A | * | 11/1998 | Haines .......................... | 386/92 |
| 5,973,723 | A | * | 10/1999 | DeLuca ......................... | 725/34 |
| 6,593,976 | B1 | * | 7/2003 | Lord ............................. | 348/731 |
| 7,012,653 | B1 | * | 3/2006 | Strickland et al. ............ | 348/731 |
| 7,061,549 | B1 | * | 6/2006 | Mabon ......................... | 348/731 |

FOREIGN PATENT DOCUMENTS

| | | | |
|---|---|---|---|
| JP | 11-112903 | * | 9/1997 |
| JP | 9-284706 | | 10/1997 |
| JP | 410145634 A | * | 5/1998 |
| JP | A 10-145634 | | 5/1998 |

* cited by examiner

Primary Examiner—Paulos Natnael
(74) Attorney, Agent, or Firm—Oliff & Berridge, PLC

(57) ABSTRACT

A digital broadcasting receiver for changing a current channel from one channel to another channel when a commercial message is broadcast on the one channel on which a program is being watched. The time after changing the current channel is measured by a timer IC. When a predetermined time has passed, the current channel is returned to the one channel in response to the operation of a switch or the voice input from a microphone by a user. The program on the one channel is recorded in an RAM so that the program can be reproduced when the user wants to watch the program retroactively. As soon as the predetermined time has passed, an audio output processing section forms a voice message and informs the user of the fact from the speaker so as to draw the attention of the user to the fact.

15 Claims, 31 Drawing Sheets

DIGITAL BROADCASTING RECEIVER

The present disclosure relates to the subject matter contained in Japanese Patent Application No. 2001-270827 filed on Sep. 6, 2002, which is incorporated herein by reference in its entirety.

BACKGROUND OF THE INVENTION

1. Field of the Invention

The present invention relates to a digital broadcasting receiver designed to be capable of supporting diverse requests of a user in channel change.

2. Description of the Related Art

In commercial television broadcasting service, commercial messages are inserted at any time during broadcasting on one channel. Among users, some prefer not to watch commercial messages. When a commercial message is broadcast on one channel while such a user is watching a broadcast on the one channel, the user operates a switch on a remote controller or the like so as to change the current channel from the one channel to another channel in order to watch another broadcast. When the user judges that the commercial message is terminated after a lapse of time, the user operates a switch on the remote controller so as to return the current channel back to the original channel.

Since the channel is changed in accordance with the judgement of the user, the commercial message may be still on air when the current channel is returned to the original channel. In such a case, the user may have to change the channel again. On the other hand, as for a portion which had been broadcast on the original channel while the user was watching another broadcast on another channel, the user would miss the portion even if the user returns the current channel back to the original channel.

The user may forget to operate the control for returning the current channel to the original channel, or may delay returning the current channel to the original channel and therefore the commercial message may have been terminated when the user returns the current channel to the original channel. On this occasion, the program broadcast before the channel change may have already started again. In such a case, it brings a result that the user misses the portion of the program as described above.

For a user, it may be desired that the current channel is changed from the new channel back to the original channel automatically under a condition such as after a lapse of time. On the other hand, however, it may be desired for the user that the user changes the current channel at the user's will in accordance with a condition such as the contents of the program in order to continue to watch the program on the new channel. In the later case, the setting of automatic return to the original channel does not meet the intention of the user.

As described above, a user has diverse requests in processing of the channel change, for example, in a case where the user watching digital broadcasting changes the current channel from one channel on which a commercial message is broadcast, to another channel. However, there is a problem that such intentions of the user cannot be supported exactly and sufficiently in a conventional art, so that enjoyment of the user watching the digital broadcasting is spoiled.

SUMMARY OF THE INVENTION

The present invention is developed in consideration of such present situation. It is an object of the invention to provide a digital broadcasting receiver designed to be capable of supporting diverse requests of a user when the user changes a current channel from one channel to another channel while a commercial message is broadcast on the one channel.

The object is attained by configuring a digital broadcasting receiver according to a first aspect of the invention so that the digital broadcasting receiver for selecting and watching one channel (original channel) from a received digital broadcasting wave including a plurality of channels, the digital broadcasting receiver including a channel changing section; a measuring section for measuring a watching time in which a user watches the another channel changed from the one channel, and an operation section for returning the current channel to the one channel from the another channel after the measuring section measures a predetermined time.

According to the first aspect of the invention, the operation section is provided to return the current channel to the one channel from the another channel after the predetermined time has passed since the current channel was changed from the one channel to the another channel. Accordingly, the user can reflect the user's will on the operation of the channel change.

According to a second aspect of the invention, there is provided a warning section for notifying a warning when returning from the another channel to the one channel.

According to the second aspect of the invention, the warning section is provided to notify the warning when returning from the another channel to the one channel. Accordingly, the user is informed of the channel change in advance. It is therefore possible to eliminate discomfort that might be generated when the sound or the screen is changed suddenly with the channel change. In addition, there is no fear that there unfavorably occurs such a situation against the user's intention that the watching time on the another channel is elongated so that the user misses a program on the one channel.

According to a third aspect of the invention, the warning section is an output section for outputting warning sound or voice, or a display section for displaying character or graphic.

According to a fourth aspect of the invention, the warning section is a second display section for changing the color of character or graphic, which is displayed on a display, from a normal display state.

According to the third and fourth aspects of the invention, a warning for the channel change is notified aurally or visually so that it is judged clearly that the warning has been given.

According to a fifth aspect of the invention, foreground color of a display is changed stepwise when the operation section is not operated for the predetermined time.

According to the fifth aspect of the invention, the foreground color of the display is changed stepwise when the operation section for returning the current channel to the one channel from the another channel is not operated for the predetermined time. Accordingly, the user is visually reminded that the user has forgotten the operation of returning the current channel to the one channel. Thus, the user can take a necessary action.

According to a sixth aspect of the invention, a digital broadcasting receiver is configured so that the digital broadcasting receiver for selecting and watching one channel (original channel) from a received digital broadcasting wave including a plurality of channels, the digital broadcasting receiver including a detecting section for detecting a commercial message and an instruction section for giving an instruction to change a current channel from the one channel to another channel on which a commercial-message is not broadcast when the detecting section detects that a commercial message is broadcast on the original channel, which is being watched.

According to the sixth aspect o the invention, the user gives, at the user's will, an instruction to change the current channel from one channel to another channel on which a commercial message is not broadcast, when a commercial message is broadcast on the one channel. Accordingly, the user can change the current channel in accordance with the user's intention. In addition, it is not necessary to search another channel on which a commercial message is not broadcast so that an operation burden imposed on the user can be lightened.

According to a seventh aspect of the invention, there is provided an automatic-changing determination section for determining whether to automatically change the current channel to the another channel on which the commercial message is not broadcast when detecting that the commercial message is broadcast on the one channel, which is being watched.

According to the seventh aspect of the invention, the automatic-changing determination section is provided for determining whether to automatically change the current channel to the another channel on which the commercial message is not broadcast when the commercial message is broadcast on the one channel, which is being watched. Accordingly, in accordance with a condition such as program contents, the user can determine whether to change the current channel automatically or in response to an instruction of the user.

According to an eighth aspect of the invention, there is provided a returning section for returning the current channel to the one channel from the another channel when it is detected that the commercial message is not broadcast on the original channel, which was watched.

According to the eighth aspect of the invention, the returning section is provided for returning the current channel to the original channel from the another channel when it is detected that the commercial message is not broadcast on the original channel. Accordingly, the user can watch the program on the original channel without watching the commercial message.

According to a ninth aspect of the invention, there is provided an instruction section for giving an instruction to watch the another channel continuously when the current channel is changed from the original channel to the another channel.

According to the ninth aspect of the invention, the instruction section is provided for giving an instruction to watch the another channel continuously when the current channel is changed from the original channel to the another channel. Accordingly, based on the user's preference in response to the broadcast contents, it is determined which channel, that is, the original channel or the another channel is watched continuously.

According to a tenth aspect of the invention, there are provided a returning section for returning the current channel to the original channel from the another channel after the user watches the another channel and an automatic reproducing section for automatically and retroactively reproducing a portion which has been broadcast on the original channel but has not been watched, when the current channel is returned to the original channel.

According to the tenth aspect of the invention, the automatic reproducing section is provided for automatically and retroactively reproducing a portion which has been broadcast on the one channel but has not been watched, when the current channel is returned from the another channel to the original channel. Accordingly, the user can automatically watch the contents which have been broadcast on the original channel during the time when the current channel is changed to the another channel. Thus, an operation burden imposed on the user is lightened. In addition, the user can avoid missing the portion which has been broadcast on the original channel but has not been watched. Thus, there is no fear that the enjoyment in watching the digital broadcasting is spoiled.

According to an eleventh aspect of the invention, there is provided a returning section for returning the current channel to the original channel from the another channel after the user watches the another channel and a reproduction instructing section for giving an instruction to retroactively reproduce a portion which has been broadcast on the original channel but has not been watched, when the current channel is returned to the original channel.

According to the eleventh aspect of the invention, when the current channel is returned to the original channel from the another channel, the reproduction instructing section gives an instruction to carry out processing of retroactively reproducing the portion which has been broadcast on the original channel but has not been watched. Accordingly, the user can determine at the user's will whether to retroactively reproduce the portion which has not been watched.

According to a twelfth aspect of the invention, there is provided a returning section for returning the current channel to the original channel from the another channel after the user watches the another channel and a reproduction determining section for determining whether to automatically and retroactively reproduce a portion which has been broadcast on the original channel but has not been watched, when the current channel is returned to the original channel.

According to the twelfth aspect of the invention, in accordance with a condition such as the program contents, the user can determine whether to automatically carry out processing of retroactively reproducing the portion which has been broadcast on the original channel but has not been watched, when the current channel is returned to the original channel from the another channel.

According to a thirteenth aspect of the invention, reproduction time for retroactively reproducing the portion which has been broadcast on the original channel but has not been watched, is set as an initial value in advance.

According to the thirteenth aspect of the invention, the reproduction time for retroactively reproducing the portion which has been broadcast on the original channel but has not been watched, is set as an initial value in advance. Accordingly, it is not necessary to input the reproduction time, so that an operation burden imposed on the user is lightened.

According to a fourteenth aspect of the invention, there is provided a setting section for setting the reproduction time to retroactively reproduce the portion which has been broadcast on the original channel but has not been watched.

According to the fourteenth aspect of the invention, the setting section is provided for setting the reproduction time to retroactively reproduce the portion which has been broadcast on the original channel but has not been watched. Accordingly, the user can set a desired reproduction time in accordance with the program contents or the like.

According to a fifteenth aspect of the invention, there is provided a digital broadcasting receiver for selecting and watching one channel (original channel) from a received digital broadcasting wave including a plurality of channels, the digital broadcasting receiver including a detecting section for detecting a commercial message, an instruction section for giving an instruction to change a current channel from the original channel to another channel on which a commercial message is not broadcast when detecting that a commercial message is broadcast on the original channel while watching the original channel, a measuring section for measuring a watching time in which the another channel is watched to which the current channel is changed from the original channel, an operation section for returning the current channel to the original channel from the another channel after the measuring section measures a predetermined time, a reproduction instructing section for giving an instruction to retroactively reproduce a portion which has been broadcast on the original channel but has not been watched when the current channel is returned to the original channel; and a setting section for setting a reproduction time to retroactively reproduce the portion which has been broadcast on the original channel but has not been watched.

According to the fifteenth aspect of the invention, the user's intention can be reflected on the processing of changing the current channel between a channel on which a commercial message is broadcast and a channel on which a commercial message is not broadcast, and the processing of retroactively reproducing the portion which has been broadcast on the original channel but has not been watched, when the current channel is returned to the original channel.

DETAILED DESCRIPTION OF THE PREFERRED EMBODIMENTS

Figure 2:
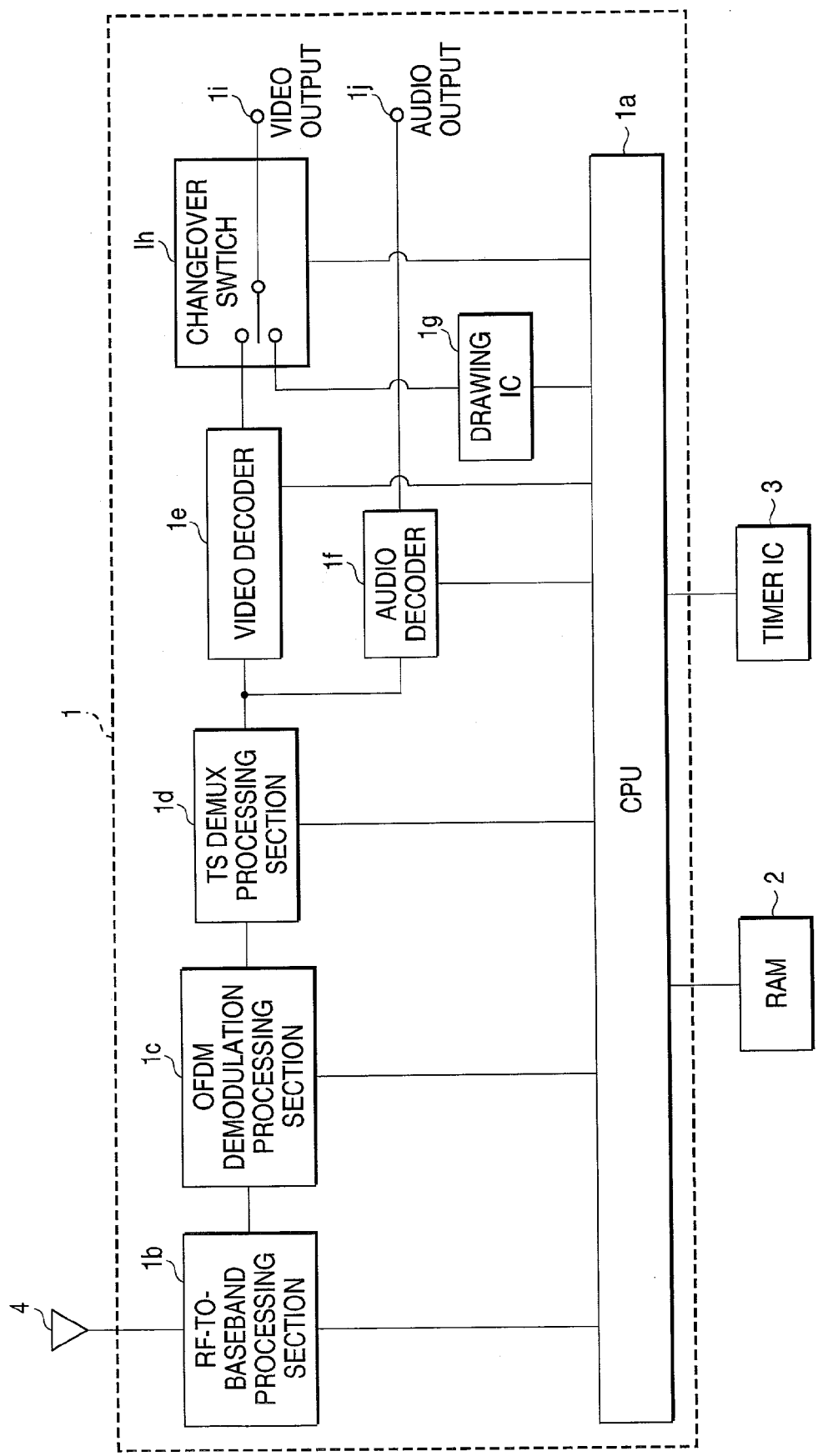
FIG. 2 is a block diagram showing a digital broadcasting receiver according to the embodiment of the invention.

Embodiments of the invention will be described below with reference to the drawings. FIG. 2 is a schematic block diagram showing an example of a digital broadcasting receiver to which the invention is applied. In FIG. 2, a digital broadcasting receiver 1 receives a digital broadcasting wave including a plurality of channels through an antenna 4. The digital broadcasting wave is transmitted as a UHF-band RF (Radio Frequency) signal using an OFDM (Orthogonal Frequency Division Multiplexing) modulation system.

The digital broadcasting receiver 1 is provided with a CPU (Central Processing Unit) 1a, an RF-to-baseband processing section 1b, an OFDM demodulation processing section 1c, a TS (Transport Stream) DEMUX (Demaltiplexor) processing section 1d, a video decoder 1e, an audio decoder 1f, a drawing IC 1g, a changeover switch 1h and output terminals 1i and 1j.

From a multichannel RF signal received by the antenna 4, an RF signal is selected and subjected to baseband processing by the RF-to-baseband processing section 1b, and demodulated in a 64 QAM (Quadrative Amplitude Modulation) system or the like by the OFDM demodulation processing section 1c. The TS DEMUX processing section id reproduces MPEG transport stream data in the signal demodulated by the OFDM demodulation processing section 1c. The signal demodulated by the OFDM demodulation processing section 1c is further demultiplexed into an MPEG video signal and an MPEG audio signal.

The MPEG video signal is decoded into a baseband video signal by the MPEG video decoder 1e. On the other hand, the MPEG audio signal is decoded into a baseband audio signal by the MPEG audio decoder 1f. The video signal is supplied to a display through the output terminal 1i while the audio signal is supplied to a speaker through the output terminal 1j and an audio output processing section.

The changeover switch 1h changes over between the output signal from the MPEG video decoder 1e and the output signal from the drawing IC 1g and supplies the output signals to the display through the output terminal 1i. A RAM 2 stores a program being received by the digital broadcasting receiver 1. Although the RAM 2 is attached externally to the digital broadcasting receiver 1, a RAM built in the CPU 1a may be used. A timer IC 3 measures a watching time on one channel. In place of the timer IC 3 attached externally to the digital broadcasting receiver 1, a program timer of the CPU 1a may be used as a measuring section for measuring the watching time.

Figure 1:
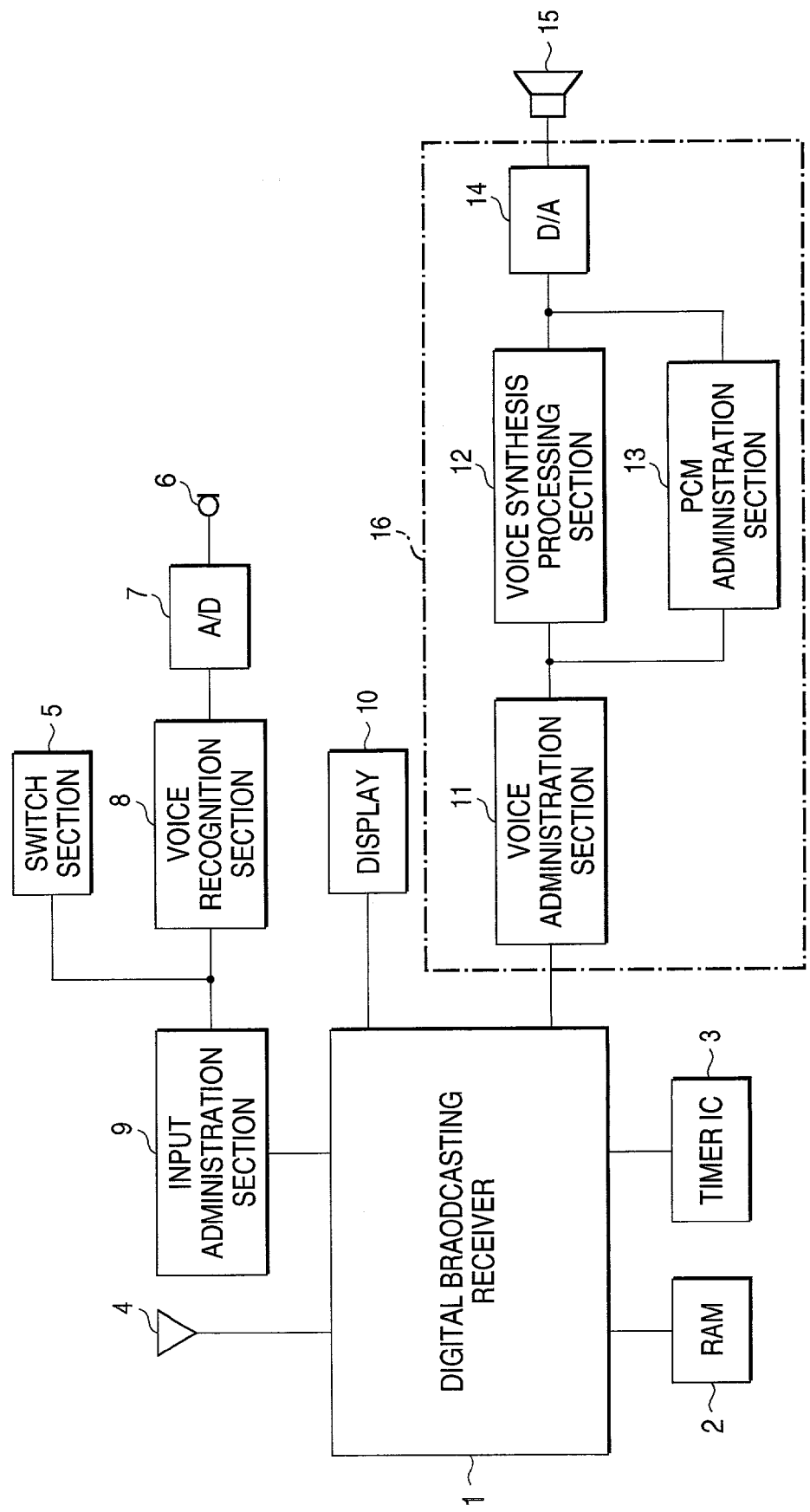
FIG. 1 is a block diagram showing an example of the system configuration according to an embodiment of the invention.

FIG. 1 is a block diagram showing an example of the system configuration according to an embodiment of the invention. The digital broadcasting receiver 1, the RAM 2, the timer IC 3 and the antenna 4 are just as described in FIG. 2. A switch section 5 is constituted by hard switches, touch switches and a remote controller. A cellular phone based on the Bluetooth technology of a narrow band radio communication system may be used as the remote controller.

A voice message is input from a microphone (hereinafter abbreviated to "Mic") 6, and an analog signal of the voice is converted into a digital signal by an A/D converter 7. The digital output signal from the A/D converter 7 is supplied to a voice recognition section 8 to perform voice recognition. An input administration section 9 administers a signal supplied from the switch section 5 or the microphone 6. A video image is displayed on a display 10.

A user operates the switch section 5 or the microphone 6 so as to return the current channel to one channel from another channel after a predetermined time has passed since the current channel was changed from the one channel to the another channel when a commercial message was broadcast on the one channel. That is, the switch section 5 or the microphone 6 has a function as an operation section for changing the current channel.

A speaker 15 is connected to the digital broadcasting receiver 1 through an audio output processing section 16. The audio output processing section 16 is constituted by a voice administration section 11, a voice synthesis processing section 12, a PCM (Pulse-Code Modulation) administration section 13 and a D/A converter 14. The voice administration section 11 stores various voice messages. The voice synthesis processing section 12 suitably synthesizes a voice message stored in the voice administration section 11. The PCM administration section 13 encodes the voice message which is an analog signal. The D/A converter 14 converts the digital voice signal into an analog signal. A warning message formed by voice synthesis in the audio output processing section 16 is delivered from the speaker 15.

The audio output processing section is to form a warning message using a voice when the user operates the switch section 5 or the microphone 6 so as to return the current channel to the one channel before the predetermined time has passed after the change of the channel. In place of such a warning message using a voice, a warning sound may be generated by a buzzer or the like. Alternatively, a warning message using character or graphic may be displayed on the display. When the current channel is changed on the basis of the time setting, such a warning message is used in processing of notifying the user that the current channel will be changed soon.

Figure 3:
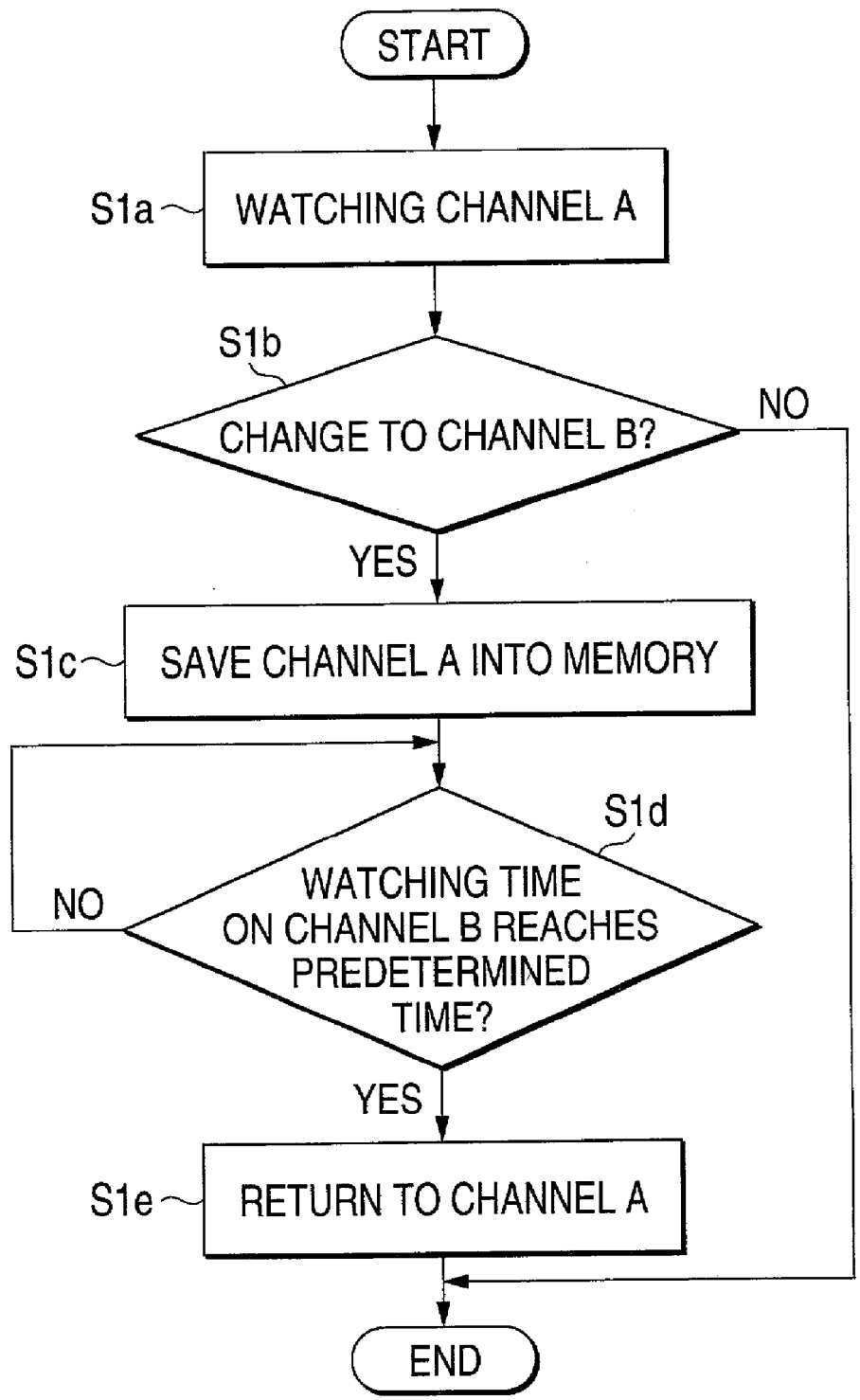
FIG. 3 is a flow chart showing the processing procedure according to the embodiment of the invention.

FIG. 3 is a flow chart showing the basic processing procedure of the invention for returning the current channel to the one channel from the another channel to which the current channel was changed when a commercial message was broadcast on the one channel. Next, description will be made on this flow chart. Incidentally, in the following flow charts in the invention, "START" designates the start of a program, and "END" designates the end thereof. In addition, this processing is executed repeatedly together with other processings during the operation of the digital broadcasting receiver 1.

(1) When a program on a channel A is being watched (Step S1a), it is judged whether the current channel is changed to a channel B or not (Step S1b). When the current channel is not changed to the channel B (the judgement result of Step S1b is NO, hereinafter abbreviated to "N"), the processing program is terminated. When the current channel is changed to the channel B (the judgement result of Step S1b is YES, hereinafter abbreviated to "Y"), the program on the channel A is stored in the memory (RAM 2 in FIG. 1) (Step S1c).

(2) Next, it is judged whether the watching time on the channel B has reaches a predetermined time or not (Step S1d) The time judgment is made by the timer IC 3 in FIG. 1. However, a timer built in the CPU may be used. When the watching time on the channel B has not yet reached the predetermined time (the judgement result of Step S1d is N), the processing program waits till the predetermined time has passed. When the watching time on the channel B reaches the predetermined time (the judgement result of Step S1d is Y), the current channel is returned to the original channel A (Step S1e).

In the embodiment of FIG. 3, a predetermined time for which a commercial message is expected to be broadcast, for example, on the channel A is set by the timer IC 3 in FIG. 1 in advance. Then, when the predetermined time has not yet passed, the current channel is prohibited from being returned to the channel A from the channel B to which the current channel is changed from the channel A on which the commercial message was broadcast. Accordingly, there is an advantage that it is possible to avoid the processing of changing the current channel from the channel A to the channel B again because the commercial message is still on air when the current channel is returned to the channel A. In addition, the program broadcast on the channel A during the channel change to the channel B is stored in the memory. Accordingly, the program on the channel A can be reproduced. Thus, even if the commercial message is over and the program already restarted and proceeds at a time when the current channel is returned to the channel A, the user can watch the missed portion of the program.

Figure 4:
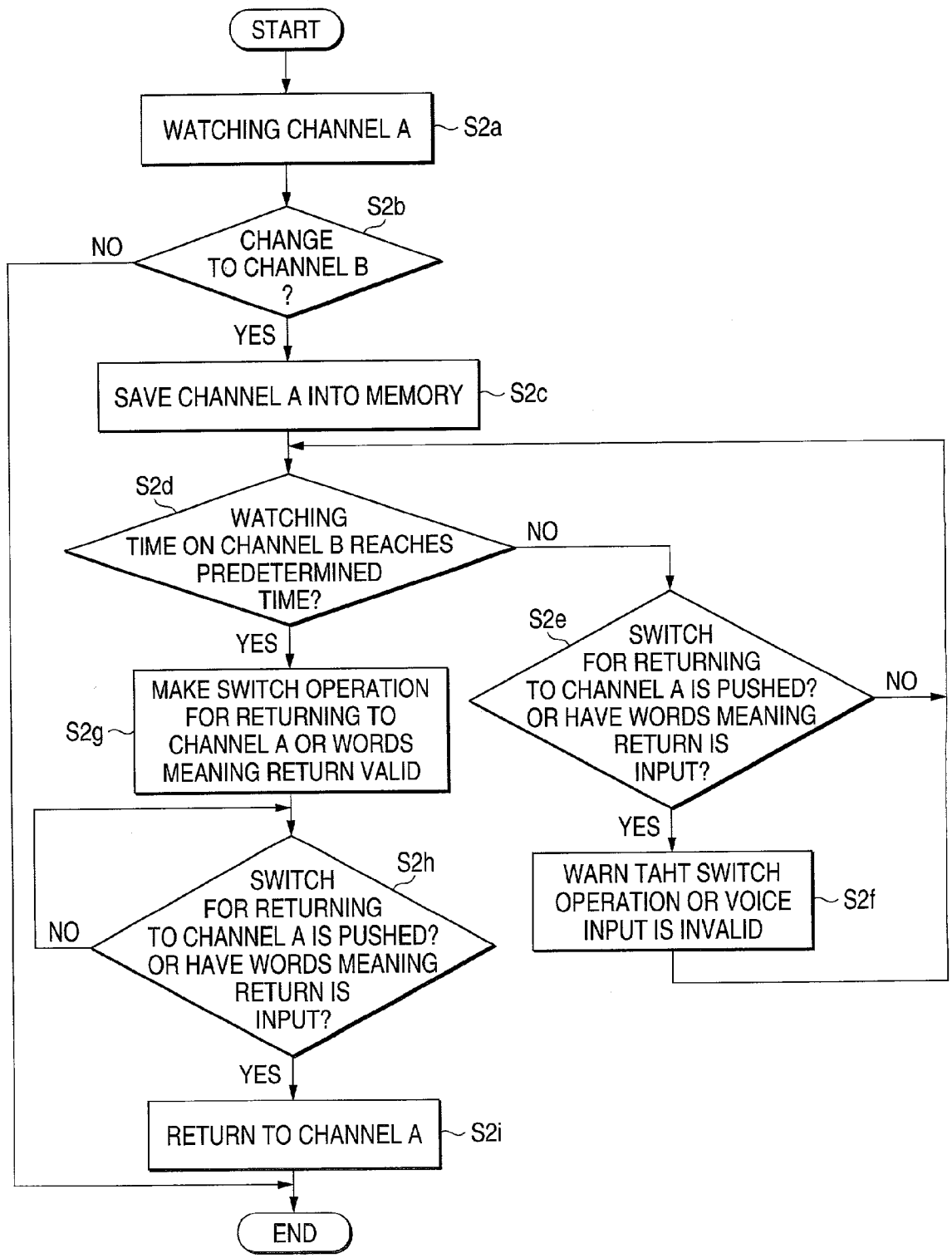
FIG. 4 is a flow chart showing the processing procedure according to another embodiment of the invention.

FIG. 4 is a flow chart showing the processing procedure according to an embodiment of the invention. Next, description will be made on this flow chart. Incidentally, this processing is executed repeatedly together with other processings during the operation of the digital broadcasting receiver 1.

(1) When a program on a channel A is being watched (Step S2a), it is judged whether the current channel is changed to a channel B or not (Step S2b). When the current channel is not changed to the channel B (the judgement result of Step S2b is N), the processing program is terminated. When the current channel is changed to the channel B (the judgement result of Step S2b is Y), the program on the channel A is stored in the memory (Step S2c).

(2) Next, it is judged whether the watching time on the channel B reaches a predetermined time or not (Step S2d). When this judgement result is N, it is judged whether a switch for returning the current channel to the channel A is pushed (by the operation of the switch section 5 in FIG. 1) or whether words meaning "return the current channel to the channel A" is input (through the voice input from the microphone 6 in FIG. 1) (Step S2e). When the judgement result of Step S2e is Y, warning that the switch operation or the voice input is invalid is given by a voice output from the audio output processing section 16 or a display on the display 10 in FIG. 1 (Step S2f) In such a manner, the operation of returning the current channel to the original channel A is made invalid before the predetermined time set by the timer IC has passed, so that the user is prevented from watching a commercial message against the user's intention. The processing program returns to the processing of Step S2d when the judgement result of Step S2e is N or after the warning in Step S2f is given.

(3) When the watching time on the channel B has reached the predetermined time, the judgement result of Step S2d becomes Y, and then, the switch for returning the current channel to the channel A or the words meaning "return the current channel to the channel A" are made valid (Step S2g). In the processing of Step S2g, when a touch switch is used as the switch for returning the current channel to the channel A, the touch switch is displayed on the display so as to allow the user to operate the touch switch. Otherwise, when another switch such as a hard switch is used, the operation of the switch is made acceptable by the system.

(4) Next, it is judged whether the switch for returning the current channel to the channel A is pushed or whether the words meaning "return the current channel to the channel A" is input (Step S2h). When the operation of the switch or the voice input of the words is not performed (the judgement result of Step S2h is N), the processing program waits. When the operation of the switch or the voice input of the words is performed (the judgement result of Step S2h is Y), the current channel is returned to the original channel A (Step S2i).

Figure 5:
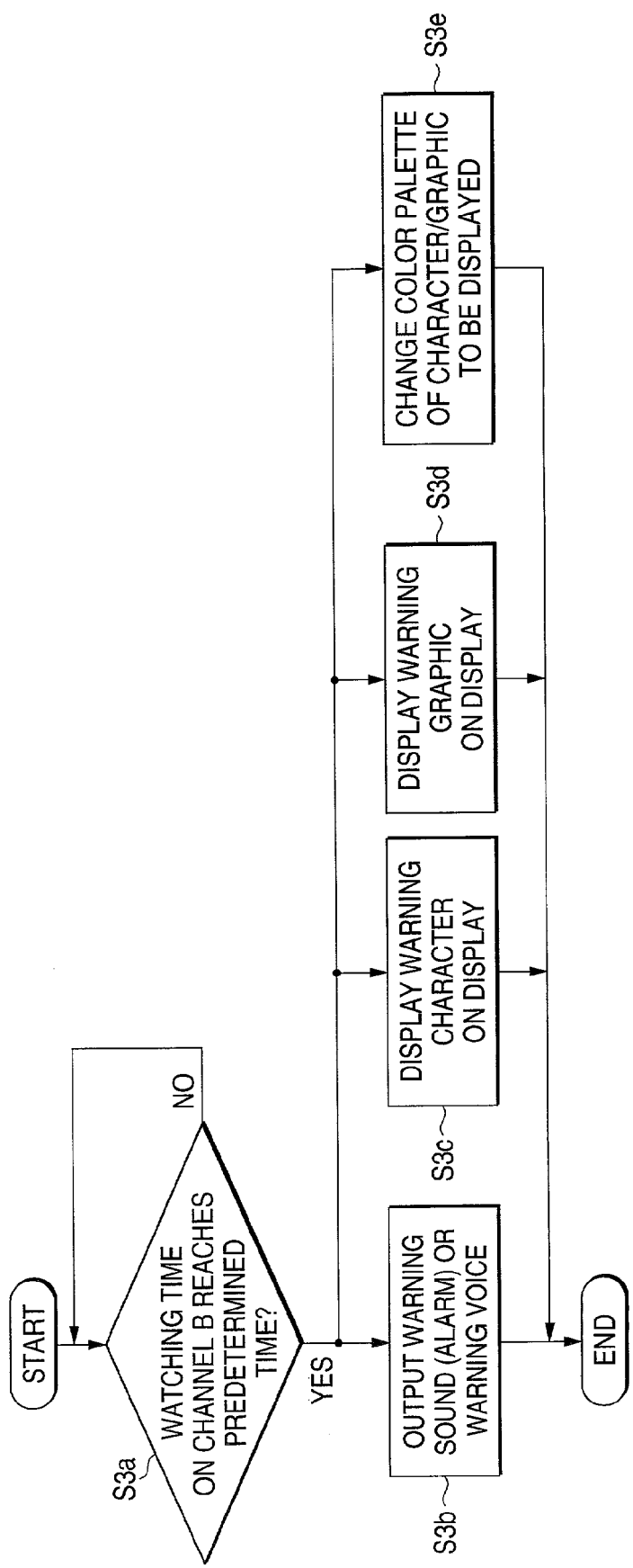
FIG. 5 is a flow chart showing the processing procedure according to another embodiment of the invention.

FIG. 5 is a flow chart showing the processing procedure according to another embodiment of the invention. Next, description will be made on this flow chart. In this embodiment, there is shown an example of processing after the current channel has been changed from the channel A to the channel B as shown in the example of FIG. 4.

(1) It is judged whether the watching time on the channel B reaches a predetermined time or not (Step S3a). When this judgement result is N, the processing program waits till the predetermined time has passed. When the watching time on the channel B reaches the predetermined time (the judgement result of Step S3a is Y), any one of the following processings of Steps S3b to S3e is carried out. Which processing to carry out is set in the digital broadcasting receiver 1 by the user in advance.

(2) A warning sound (alarm) or a warning voice is output (Step S3b). Warning characters are displayed on the display (Step S3c). A warning graphic is displayed on the display (Step S3d). A specific symbol or mark can be registered as this warning graphic in the CPU 1a in FIG. 1 in advance. The color palette of the character/graphic to be displayed is changed (Step S3e). The processing of Step S3e is carried out to make the foreground color of the character/graphic to be displayed on the display different from the normal display color in order to warn the user.

Here, a phrase such as "Time to return the current channel to channel A is approaching" is used as the voice or character warning message. The warning graphic is also brought into agreement with the meaning of such a phrase. On the other hand, a sound such as "pop" is generated as the warning sound.

In the embodiment of FIG. 5, one warning section selected and set from various warning sections in advance notifies the user that the watching time on the channel B reaches the predetermined time, so as to urge the user to carry out the operation of returning the current channel to the channel A. Accordingly, the user is prevented from forgetting to carry out the operation of returning the current channel to the channel A, so that the current channel can be changed in accordance with the intention of the user.

Figure 6:
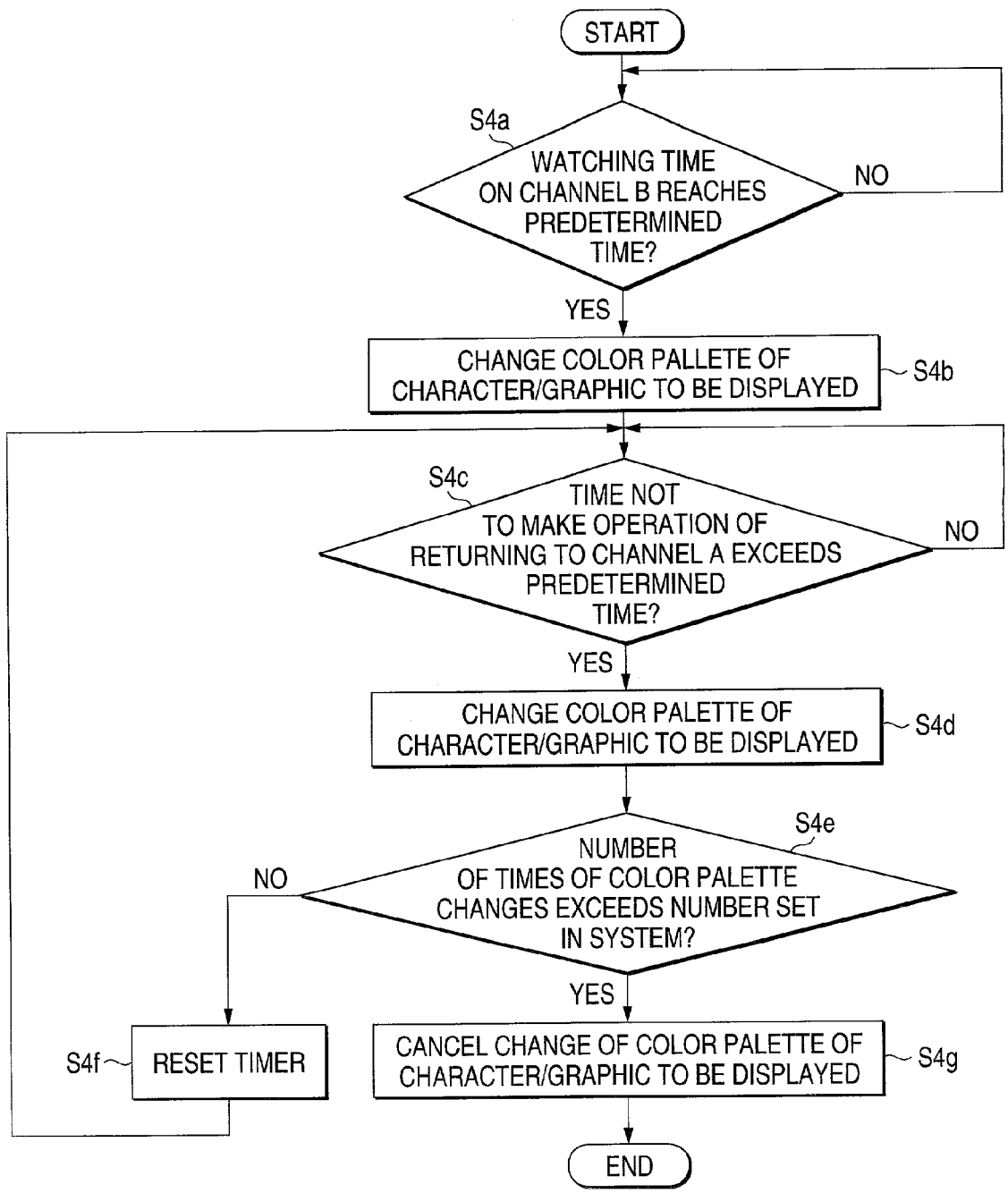
FIG. 6 is a flow chart showing the processing procedure according to another embodiment of the invention.

FIG. 6 is a flow chart showing the processing procedure according to another embodiment of the invention. Next, description will be made on this flow chart. Also in this embodiment, there is shown an example of processing after the current channel has been changed from the channel A to the channel B as shown in the embodiment of FIG. 4.

(1) It is judged whether the watching time on the channel B reaches a predetermined time or not (Step S4a). When this judgement result is N, the processing program waits till the predetermined time has passed. When the watching time on the channel B reaches the predetermined time (the judgement result of Step S4a is Y), the color palette of the character/graphic to be displayed is changed (Step S4b). Next, it is judged whether the time in which the operation of returning the current channel to the channel A is not performed exceeds a predetermined time or not (Step S4c).

(2) When the time in which the operation of returning the current channel to the channel A is not performed does not exceed the predetermined time (the judgement result of Step S4c is N), the processing program waits till the predetermined time has passed. When the time in which the operation of returning the current channel to the channel A is not performed exceeds the predetermined time (the judgement result of Step S4c is Y), the color palette of the character/graphic to be displayed next is changed (Step S4d). Subsequently, it is judged whether the number of times of color palette changes exceeds the number set in the system or not (Step S4e).

(3) When the number of times of color palette changes exceeds the number set in the system (the judgement result of Step S4e is Y), the change of the color palette of the character/graphic to be displayed is canceled (Step S4g). When the judgement result of Step S4e is N, the timer is reset (Step S4f), and the processing program returns to the processing of Step S4c, in which it is judged whether the time in which the operation of returning the current channel to the channel A is not performed exceeds the predetermined time or not.

(4) When the judgement result of Step S4c at this time is Y, the color palette of the character/graphic to be displayed is changed (Step S4d). The foreground color of the display on this occasion is made different from that of the color palette changed in Step S4d on the last occasion. Subsequently, the loop processing of Step S4c to Step S4f is repeated. In such a manner, when the operation of returning the current channel to the channel A is not carried out, the foreground color of the display is changed stepwise so as to warn the user.

Figure 7:
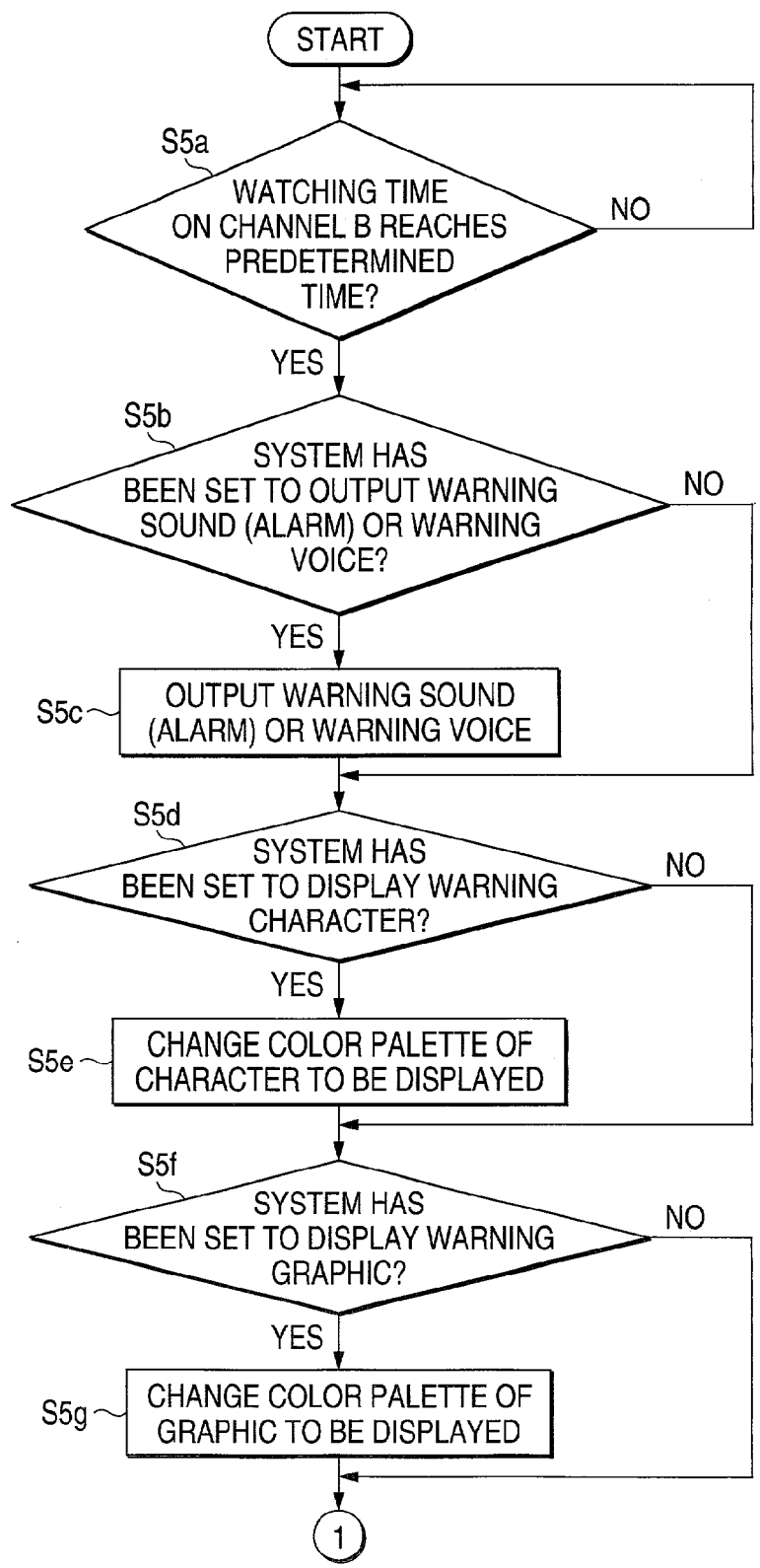
FIG. 7 is a flow chart showing the processing procedure according to another embodiment of the invention.
Figure 8:
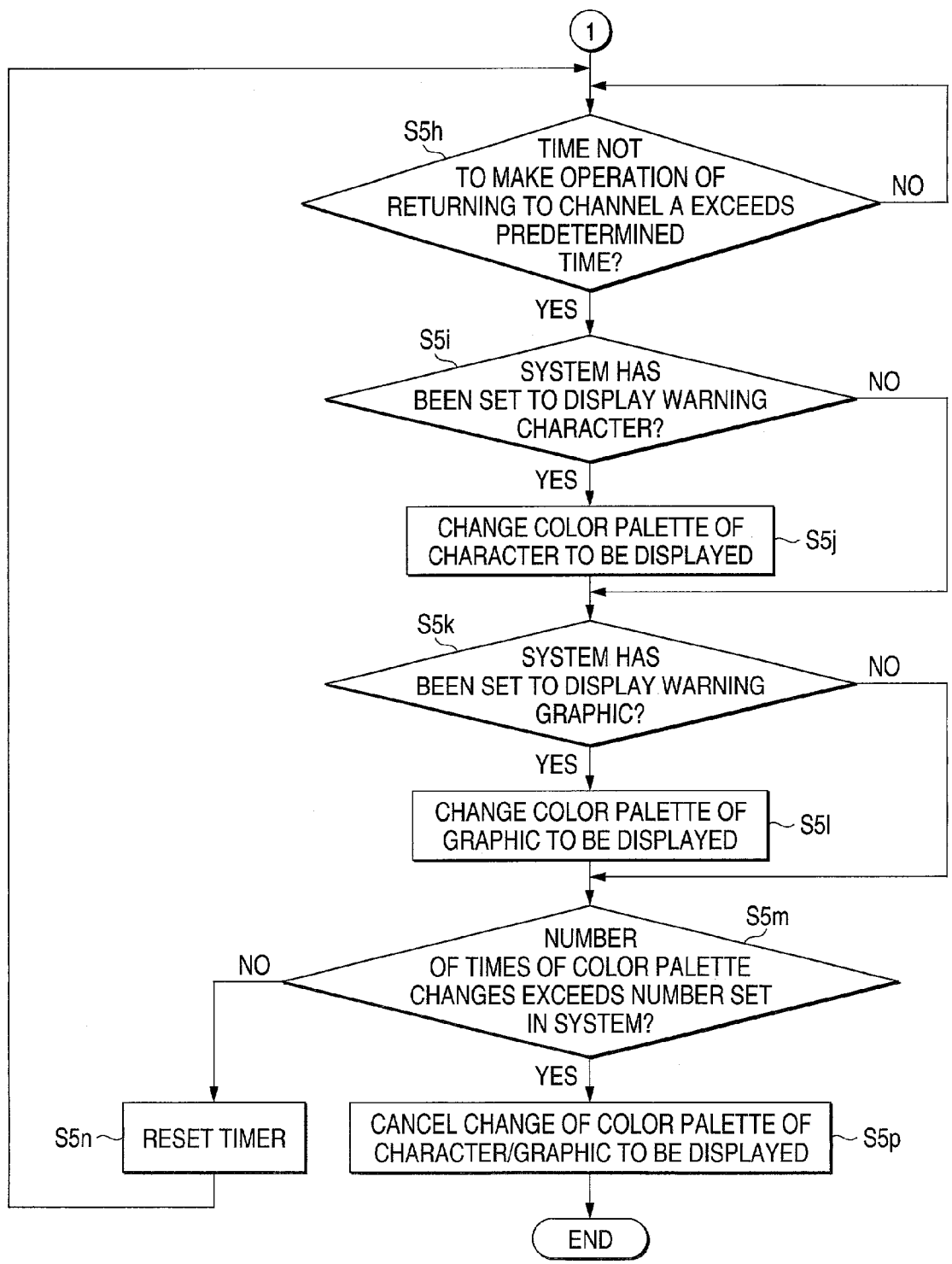
FIG. 8 is a flow chart showing the processing procedure according to another embodiment of the invention.

FIGS. 7 and 8 are flow charts showing the processing procedure according to another embodiment of the invention. Next, description will be made on these flow charts. Also in this embodiment, there is shown an example of processing after the current channel has been changed from the channel A to the channel B as shown in the example of FIG. 4. In the embodiment of FIG. 7, the system for giving a warning when the current channel is changed is set in various modes.

(1) It is judged whether the watching time on the channel B reaches a predetermined time or not (Step S5a). When this judgement result is N, the processing program waits till the predetermined time has passed. When the watching time on the channel B reaches the predetermined time (the judgement result of Step S5a is Y), it is judged whether the system has been set to output a warning sound (alarm) or a warning voice or not (Step S5b). When this judgement result is Y, a warning sound (alarm) or a warning voice is output (Step S5c).

(2) After the processing of Step S5c, or when the system has not been set to output a warning sound (alarm) or a warning voice (the judgement result of Step S5b is N), it is next judged whether the system has been set to display a warning character or not (Step S5d). When this judgement result is Y, the color palette of the character to be displayed is changed (Step S5e) After the processing of Step S5e or when the system has not been set to display a warning character (the judgement result of Step S5d is N), it is judged whether the system has been set to display a warning graphic or not (Step S5f). When this judgement result is Y, the color palette of the graphic to be displayed is changed (Step S5g).

(3) After the processing of Step S5g or when the system has not been set to display a warning graphic (the judgement result of Step S5f is N), it is next judged whether time not to make the operation of returning the current channel to the channel A has exceeded a predetermined time or not (Step S5h). When the time in which the operation of returning the current channel to the channel A is not performed does not exceed the predetermined time (the judgement result of Step S5h is N), the processing program waits till the predetermined time has passed.

(4) When the time in which the operation of returning the current channel to the channel A is not performed exceeds the predetermined time (the judgement result of Step S5h is Y), it is next judged whether the system has been set to display a warning character or not (Step S5i). When this judgement result is Y, the color palette of the character to be displayed is changed (Step S5j). After the processing of Step S5j or when the system has not been set to output a warning character (the judgement result of Step S5i is N), it is judged whether the system has been set to display a warning graphic or not (Step S5k). When this judgement result is Y, the color palette of the graphic to be displayed is changed (Step S5l).

(5) After the processing of Step S5l or when the system has not been set to display a warning graphic (the judgement result of Step S5k is N), it is next judged whether the number of times of color palette changes exceedes the number set in the system or not (Step S5m). When this judgement result is Y, the change of the color palette of the character/graphic to be displayed is canceled (Step S5p). When the number of times of color palette changes does not exceed the number set in the system (the judgement result of Step S5m is N), the timer is reset (Step S5n), and the processing program returns to the processing of Step S5h in which it is judged whether the time in which the operation of returning the current channel to the channel A is not performed exceeds the predetermined time or not. Subsequently, the loop processing of Step S5h to Step S5n is repeated.

Figure 9:
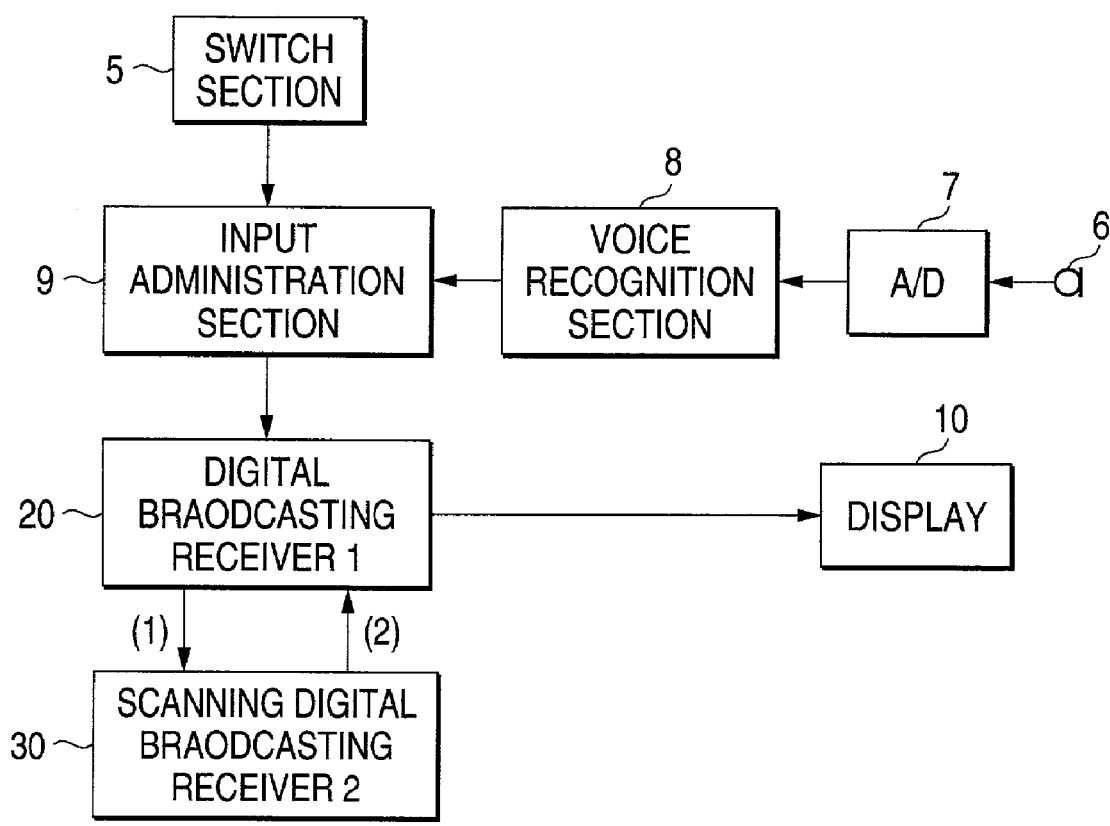
FIG. 9 is a block diagram showing an example of the system configuration according to another embodiment of the invention.

FIG. 9 is a block diagram showing an example of the configuration according to another embodiment of the invention. A reference numeral 20 represents a first digital broadcasting receiver having the same configuration as the digital broadcasting receiver 1 including the switch section 5, the microphone 6, the A/D converter 7, the voice recognition section 8, the input administration section 9 and the display 10, as shown in FIG. 1. In the embodiment of FIG. 9, a second scanning digital broadcasting receiver 30 is used separately from the digital broadcasting receiver 20. Hereinafter, the first digital broadcasting receiver will be illustrated as "digital broadcasting receiver 1" and the second digital broadcasting receiver will be illustrated as "digital broadcasting receiver 2". Incidentally, the antenna for the two digital broadcasting receivers is not shown in the drawing. Next, description will be made on the operation of the first digital broadcasting receiver 20 and the operation of the second scanning digital broadcasting receiver 30.

In processing (1), when the first digital broadcasting receiver 1 detects a commercial message in a broadcast program, the first digital broadcasting receiver 1 notifies the second scanning digital broadcasting receiver 2 of the fact of the detection. The first digital broadcasting receiver 1 is provided with a section for detecting a stereo pilot signal. The detection signal is supplied to the CPU 1a in FIG. 2 so that it is judged whether there is a commercial message or not. Alternatively, a difference between a main broadcast and a commercial message may be detected by use of data broadcasting. Further, the user may operate a switch to notify the second scanning digital broadcasting receiver 2 of the start of a commercial message.

In processing (2), the second scanning digital broadcasting receiver 2 selects a channel of a broadcasting station not broadcasting a commercial message, and notifies the first digital broadcasting receiver 1 of the channel selection. The first digital broadcasting receiver 1 makes the display 10 display a video image on the channel selected by the second scanning digital broadcasting receiver 2.

Figure 10:
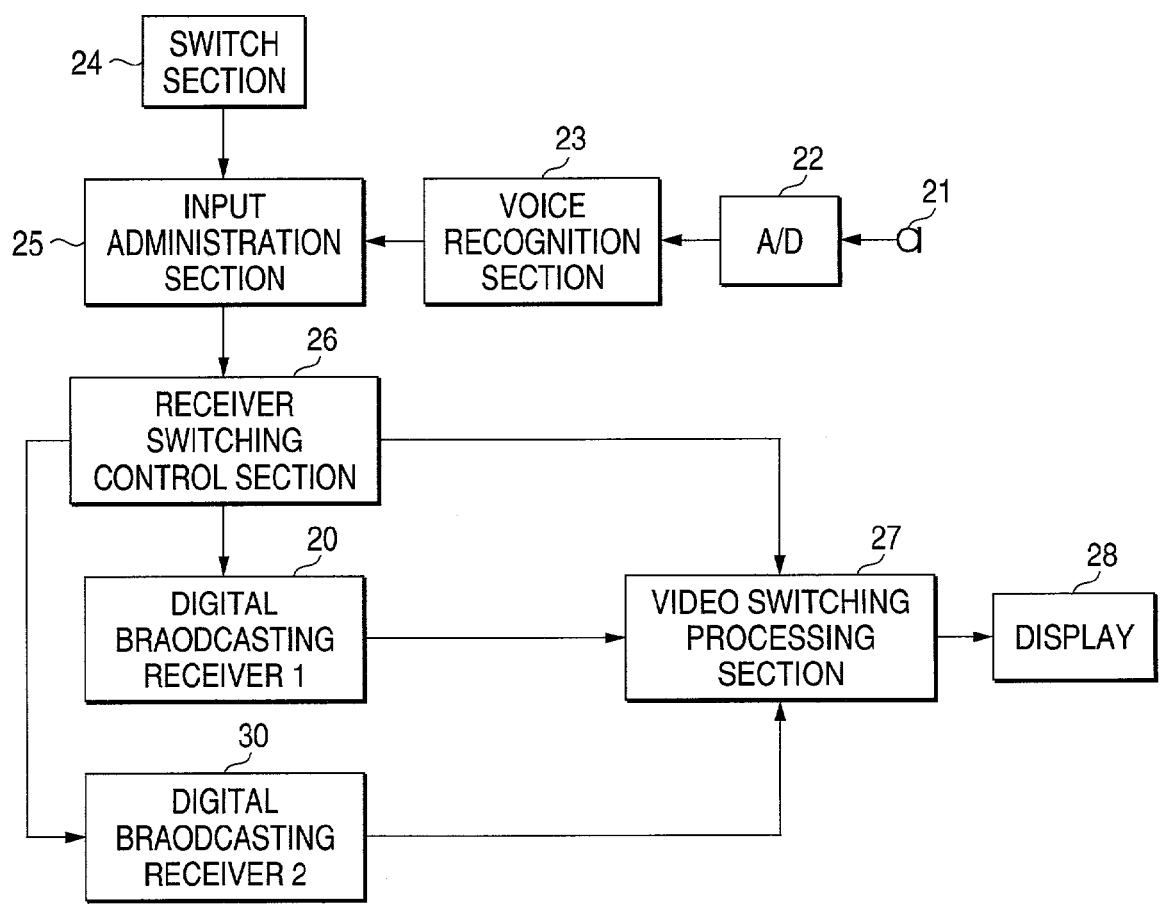
FIG. 10 is a block diagram showing an example of the system configuration according to another embodiment of the invention.

FIG. 10 is a block diagram showing an example of the configuration according to another embodiment of the invention. Also in this embodiment, two digital broadcasting receivers are used. One is used as a master receiver while the other is used as a slave receiver. Incidentally, the antenna for the two digital broadcasting receivers is not shown in the drawing.

Also in FIG. 10, the basic functions of a microphone 21, an A/D converter 22, a voice recognition section 23, a switch section 24, an input administration section 25 and a display 28 are just as described in the configuration of the digital broadcasting receiver 1 in FIG. 1. In the embodiment of FIG. 10, the microphone 21 or the switch section 24 is operated to give an instruction to change the current channel to a channel on which a commercial message is not being broadcast. That is, the microphone 21 or the switch section 24 has a function as a channel-changing instruction section. The reference numeral 26 represents a receiver switching control section, and 27 denotes a video switching processing section.

Here, assume that the first digital broadcasting receiver 1 is used as a master receiver for watching a digital broadcast at all times, while the second digital broadcasting receiver 2 is used as a slave receiver for watching another digital broadcast on which a commercial message is being not broadcast when a commercial message is detected in the first digital broadcasting receiver 1. The second digital broadcasting receiver 2 always searches digital broadcast so as to pick up a digital broadcast on which a commercial message is not being broadcast.

When a commercial message is detected in the first digital broadcasting receiver 1, the receiver switching control section 26 is notified of the fact of the detection. The receiver switching control section 26 makes the second digital broadcasting receiver 2 function as a master receiver. Then, the video switching control section 27 makes the display 28 display a video image on the digital broadcast selected by the second digital broadcasting receiver 2.

Figure 11:
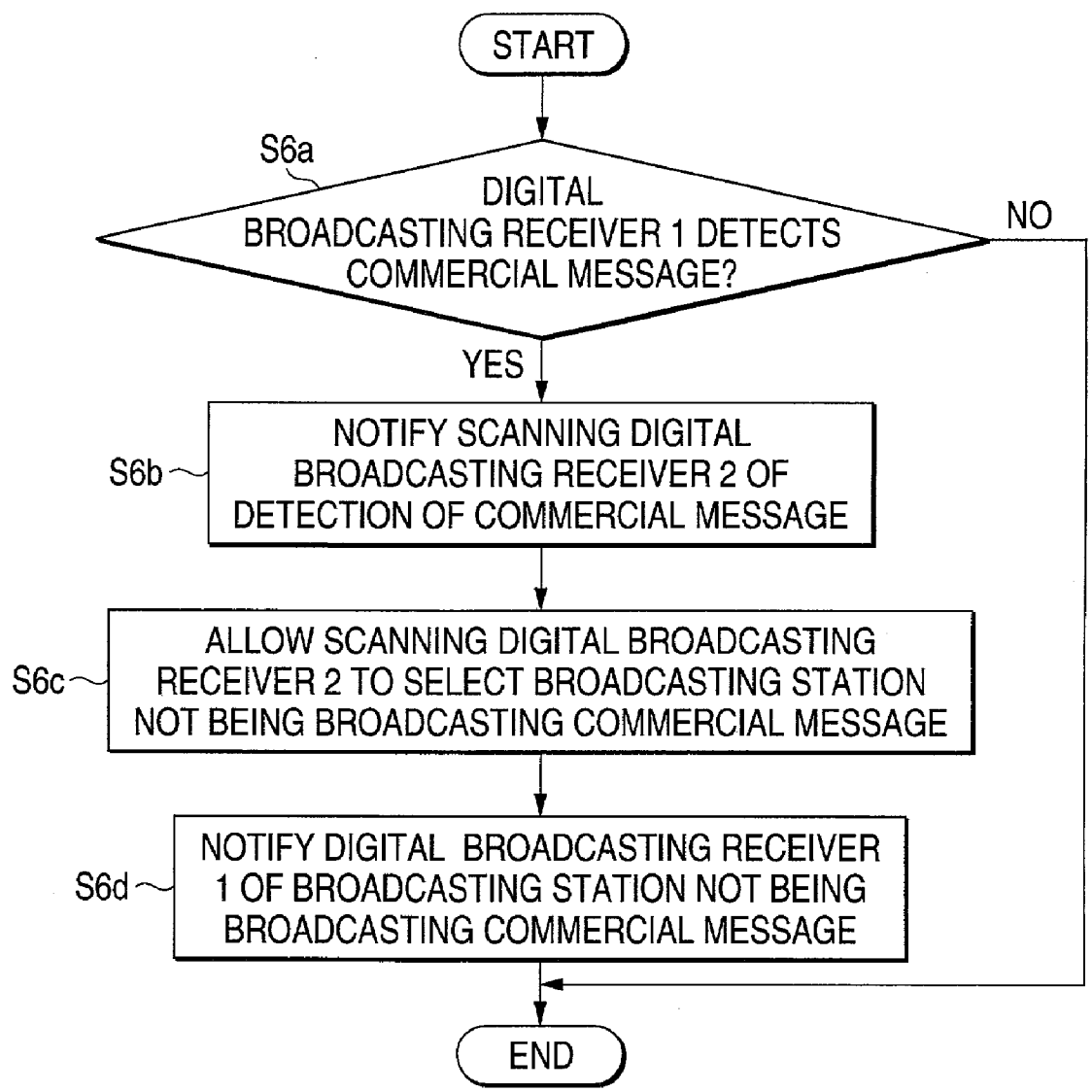
FIG. 11 is a flow chart showing the processing procedure according to another embodiment of the invention.

FIG. 11 is a flow chart showing the processing procedure of a processing example carried out by the digital broadcasting receiver based on the block diagram of FIG. 9. Next, description will be made on this flow chart. In the following flow chart, "first digital broadcasting receiver 1" will be abbreviated to "digital broadcasting receiver 1" simply, and "second digital broadcasting receiver 2" will be abbreviated to "digital broadcasting receiver 2" likewise. Incidentally, this processing is executed repeatedly together with other processings during the operation of the digital broadcasting receiver.

It is judged that the digital broadcasting receiver 1 detectes a commercial message or not (Step S6a). When no commercial message is detected (the judgement result of Step S6a is N), the processing program is terminated. When a commercial message is detected (the judgement result of Step S6a is Y), the scanning digital broadcasting receiver 2 is notified of the detection of the commercial message (Step S6b) Next, a broadcasting station not being broadcasting a commercial message is selected in the scanning digital broadcasting receiver 2 (Step S6c). At this time, setting can be done to make the digital broadcasting receiver 2 select a broadcasting station broadcasting contents belonging to the same category as the program contents of the broadcasting station received by the digital broadcasting receiver 1. Accordingly, the user can watch contents of a program belonging to the same category, such as news or sports program. Subsequently, the digital broadcasting receiver 1 is notified of the broadcasting station not being broadcasting a commercial message (Step S6d).

Figure 12:
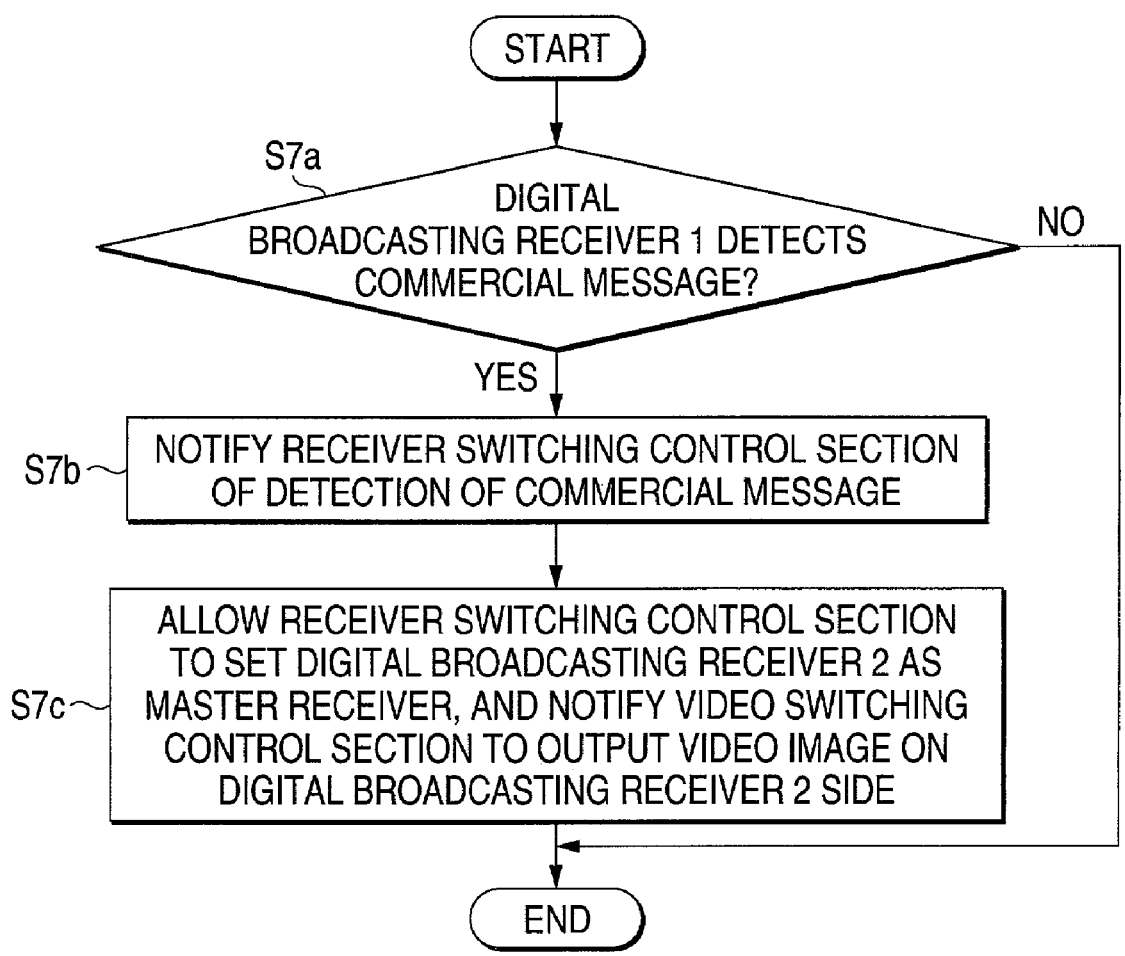
FIG. 12 is a flow chart showing the processing procedure according to another embodiment of the invention.

FIG. 12 is a flow chart showing the processing procedure of a processing example carried out by the digital broadcasting receiver based on the block diagram of FIG. 10. Next, description will be made on this flow chart.

It is judged that the digital broadcasting receiver 1 detects a commercial message or not (Step S7a). When no commercial message is detected (the judgement result of Step S7a is N), the processing program is terminated. When a commercial message is detected (the judgement result of Step S7a is Y), a receiver switching control section is notified of the detection of the commercial message (Step S7b). The receiver switching control section sets the digital broadcasting receiver 2 as a master receiver, and notifies the video switching control section to output a video image on the digital broadcasting receiver 2 side (Step S7c).

Figure 13:
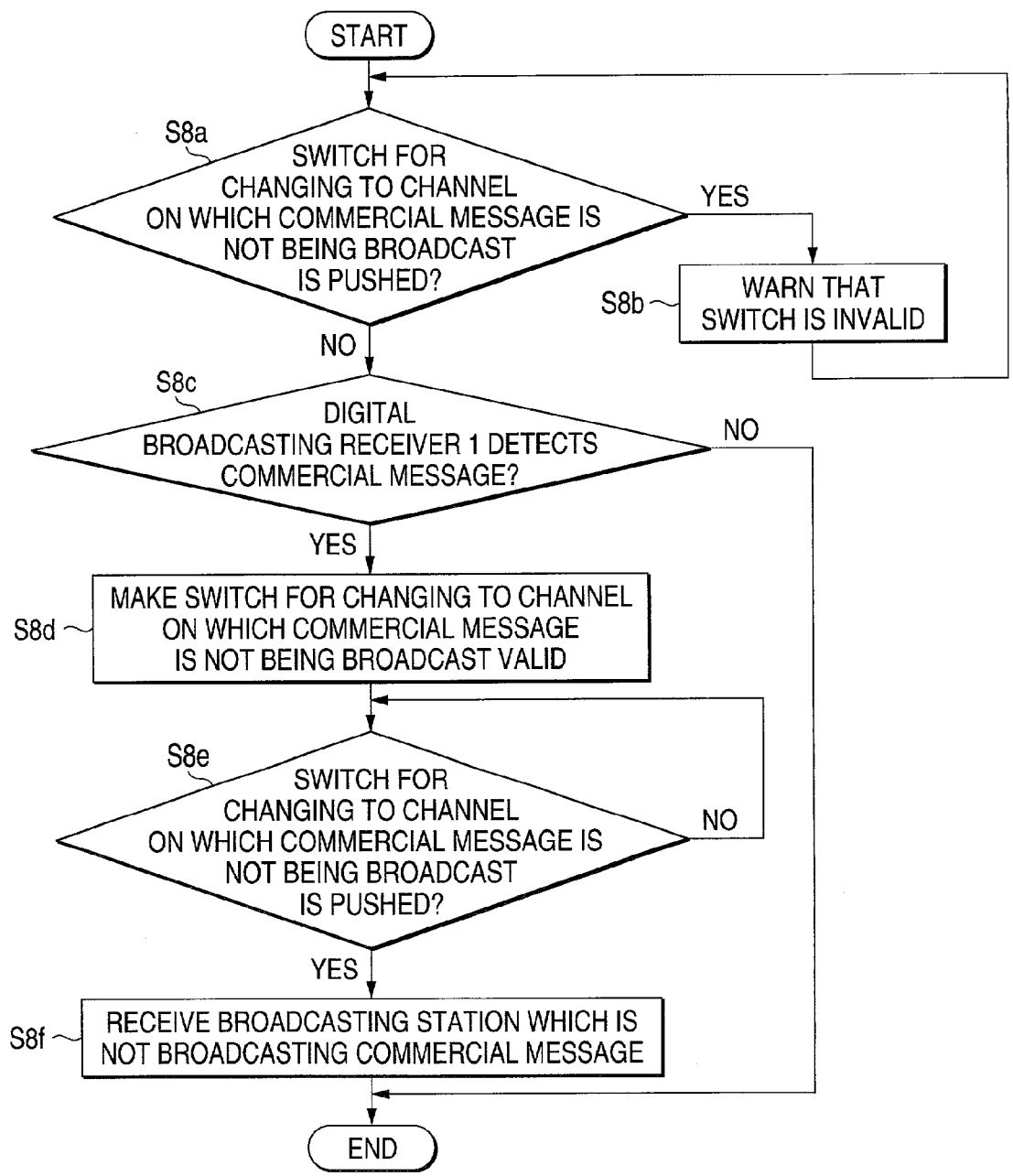
FIG. 13 is a flow chart showing the processing procedure according to another embodiment of the invention.

FIG. 13 is a flow chart showing the processing procedure of another processing example carried out by the digital broadcasting receiver based on the block diagram of FIG. 9 or 10. Next, description will be made on this flow chart.

(1) It is judged whether a switch (the switch section 5 in FIG. 9 or the switch section 24 in FIG. 10) for changing the current channel to a channel on which a commercial message is not broadcast is pushed or not (Step S8a). When this judgement result is Y, warning that the switch is invalid is given (Step S8b). Then, the processing program returns to the processing of Step S8a. When the switch is not pushed (the judgement result of Step S8a is N), it is judged whether the digital broadcasting receiver 1 detects a commercial message or not (Step S8c). When this judgement result is N, the processing program is terminated.

(2) When the digital broadcasting receiver 1 detects a commercial message, the switch for changing over contents of broadcast except for a commercial message is not broadcast is made valid (Step S8d). Next, it is judged whether the switch for changing over content of broadcast except for a commercial message is pushed or not (Step S8e). When this judgement result is N, the processing program waits in Step S8e. When the changeover switch is pushed (the judgement result of Step S8e is Y), a program by a broadcasting station not being broadcasting a commercial message at that time is received (Step S8f).

In such a manner, in the embodiment of FIG. 13, a broadcasting station not being broadcasting a commercial message can be received at the will of the user after a commercial message is broadcast in the digital broadcasting receiver 1. That is, in the embodiment of FIG. 11 or 12, a broadcasting station not being broadcasting a commercial message is selected automatically when a commercial message is received in the digital broadcasting receiver 1. On the other hand, in the embodiment of FIG. 13, a broadcasting station can be selected at the will of the user when a commercial message is broadcast. Then, the will of the user is prevented from being reflected before the digital broadcasting receiver 1 receives a commercial message.

In addition, in the embodiment of FIG. 13, the current channel may be returned to the original channel when the end of the commercial message is detected in the digital broadcasting receiver 1. In this case, the procedure of detecting the end of the commercial message and the procedure of returning to the digital broadcasting receiver 1 when the end of the commercial message is detected are added to the processing of Step S8f in FIG. 13.

Figure 14:
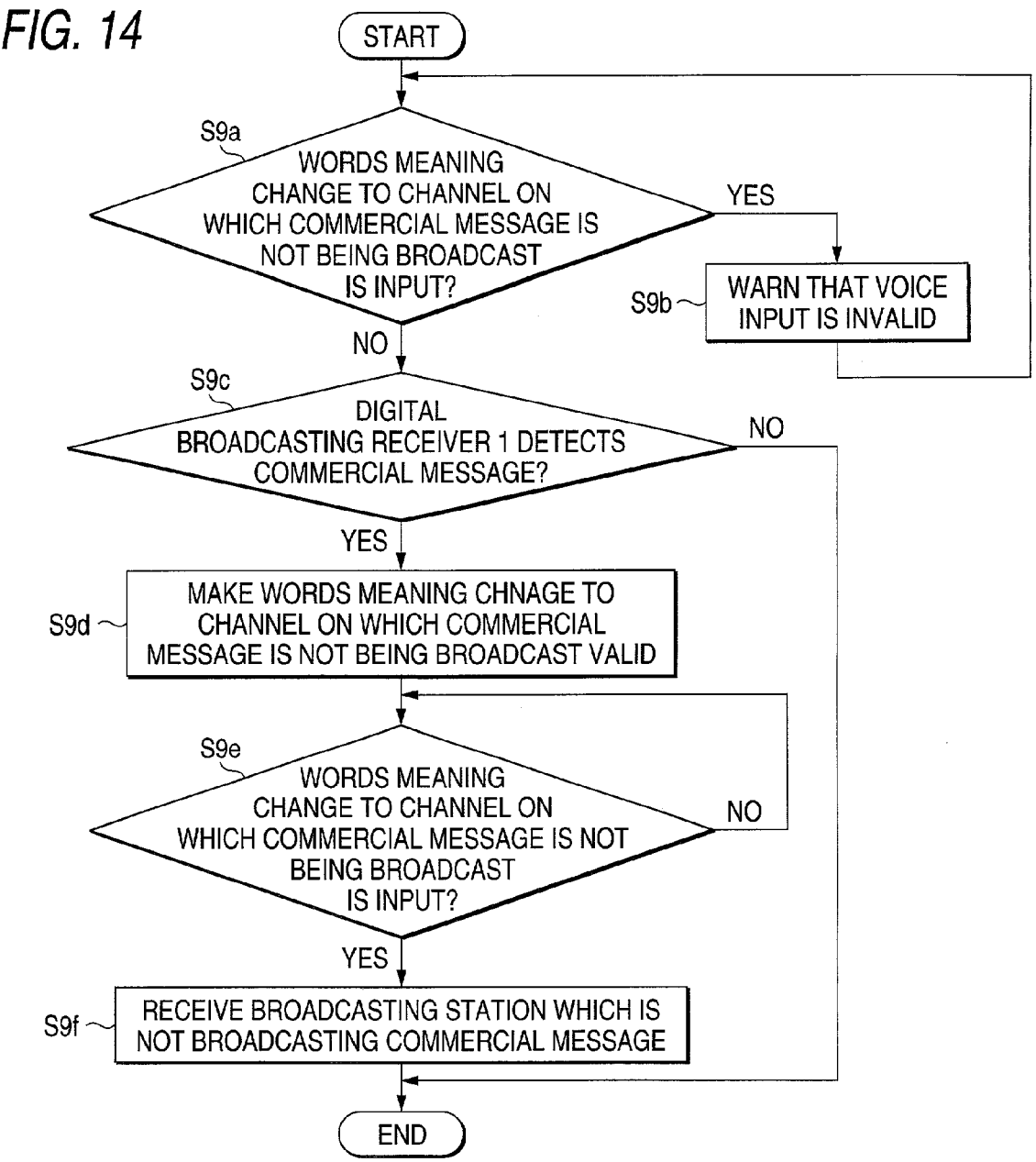
FIG. 14 is a flow chart showing the processing procedure according to another embodiment of the invention.

FIG. 14 is a flow chart showing the processing procedure of another processing example carried out by the digital broadcasting receiver based on FIG. 9 or 10. Next, description will be made on this flow chart.

(1) It is judged whether words meaning change to a channel on which a commercial message is not broadcast is input or not (Step S9a). Such words are input through the microphone 6 in FIG. 9 or the microphone 21 in FIG. 10. When this judgement result is Y, warning that the voice input is invalid is given (Step S9b), and the processing program returns to the processing of Step S9a. When no word is input (the judgement result of Step S9a is N), it is next judged whether the digital broadcasting receiver 1 detects a commercial message or not (Step S9c). When this judgement result is N, the processing program is terminated.

(2) When the digital broadcasting receiver 1 detects a commercial message, the words meaning change to a channel on which a commercial message is not broadcast are made valid (Step S9*d*). Next, it is judged whether the words meaning change to a channel on which a commercial message is not broadcast is input or not (Step S9*e*). When this judgement result is N, the processing program waits in Step S9*e*. When the words are input (the judgement result of Step S9*e* is Y), a program by a broadcasting station not broadcasting a commercial message is received (Step S9*f*).

Also in the embodiment of FIG. 14, in the same manner as in the embodiment of FIG. 13, a broadcasting station not broadcasting a commercial message can be received at the will of the user when a commercial message is detected in the digital broadcasting receiver 1. While a broadcasting station not broadcasting a commercial message is selected automatically in the embodiment of FIG. 11 or 12, the intention of the user is reflected in the processing of receiving a program by a broadcasting station not broadcasting a commercial message in the embodiment of FIG. 13 or 14.

Figure 15:
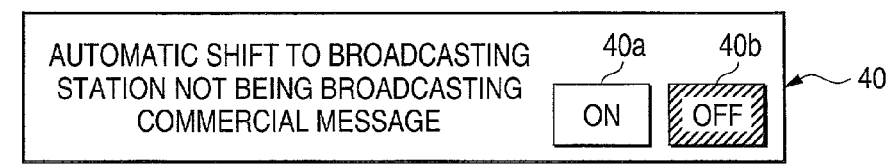
FIG. 15 is an explanatory view showing the configuration according to another embodiment of the invention.

FIG. 15 is an explanatory view showing an embodiment of the configuration in which the user can set whether to automatically receive a broadcasting station not being broadcasting a commercial message as follows. Although the digital broadcasting receiver 1 has a function as a computer in this embodiment, an information terminal such as a personal computer may be connected to the digital broadcasting receiver 1.

In FIG. 15, characters indicating "automatic shift to broadcasting station not broadcasting commercial message" are displayed on a screen 40. In addition, icons 40*a* and 40*b* of "ON" and "OFF" are displayed. The user chooses one of the icons through a mouse or a joystick so as to set the validity of the automatic shift to a broadcasting station not being broadcasting a commercial message. In such a manner, in the embodiment of FIG. 15, the setting is done using GUI (Graphical User Interface). In the embodiment of FIG. 15, the user can choose whether to change the channel automatically in accordance with a condition such as the program contents or under the instruction of the user.

Figure 16:
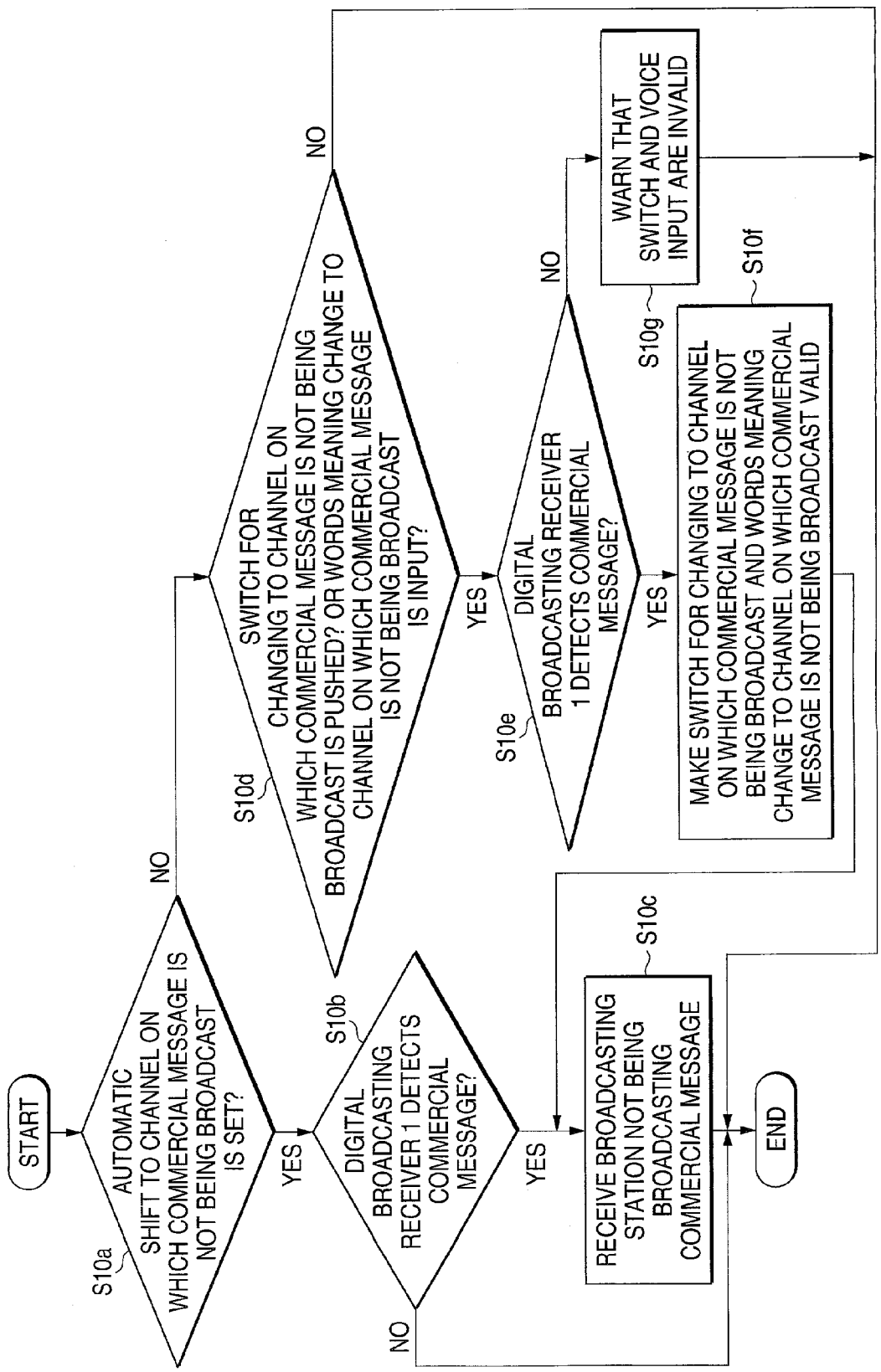
FIG. 16 is a flow chart showing the processing procedure according to another embodiment of the invention.

FIG. 16 is a flow chart showing the processing procedure of a processing example carried out by the digital broadcasting receiver based on the block diagram of FIG. 9 or 10. Next, description will be made on this flow chart.

(1) It is judged whether the setting of automatic shift to a video image other than a commercial message is ON or not (Step S10*a*). When this judgement result is Y, it is next judged whether the digital broadcasting receiver 1 detects a commercial message or not (Step S10*b*). When this judgement result is N, the processing program is terminated. When the digital broadcasting receiver 1 detects a commercial message (the judgement result of Step S10*b* is Y), a broadcasting station not being broadcasting a commercial message is received (Step S10*c*).

(2) When the setting of automatic shift to a video image other than a commercial message is not ON (the judgement result of Step S10*a* is N), it is next judged whether a switch for changing to a channel on which a commercial message is not being broadcast has been pushed or not, or whether words meaning change to a channel on which a commercial message is not being broadcast is input or not (Step S10*d*). When the judgement result of Step S10*d* is N, the processing program is terminated.

(3) When the operation of the switch or the input of the words is made (the judgement result of Step S10*d* is Y), it is next judged whether the digital broadcasting receiver 1 detects a commercial message or not (Step S10*e*). When this judgement result is N, warning that the switch operation or the voice input is invalid is given (Step S10*g*), and the processing program is terminated.

(4) When the digital broadcasting receiver 1 detects a commercial message (the judgement result of Step S10*e* is Y), the switch for changing to a channel on which a commercial message is not being broadcast or an input of the words meaning change to a channel on which a commercial message is not being broadcast is made valid (Step S10*f*). After that, the processing program jumps to the processing of Step S10*c*.

Figure 17:
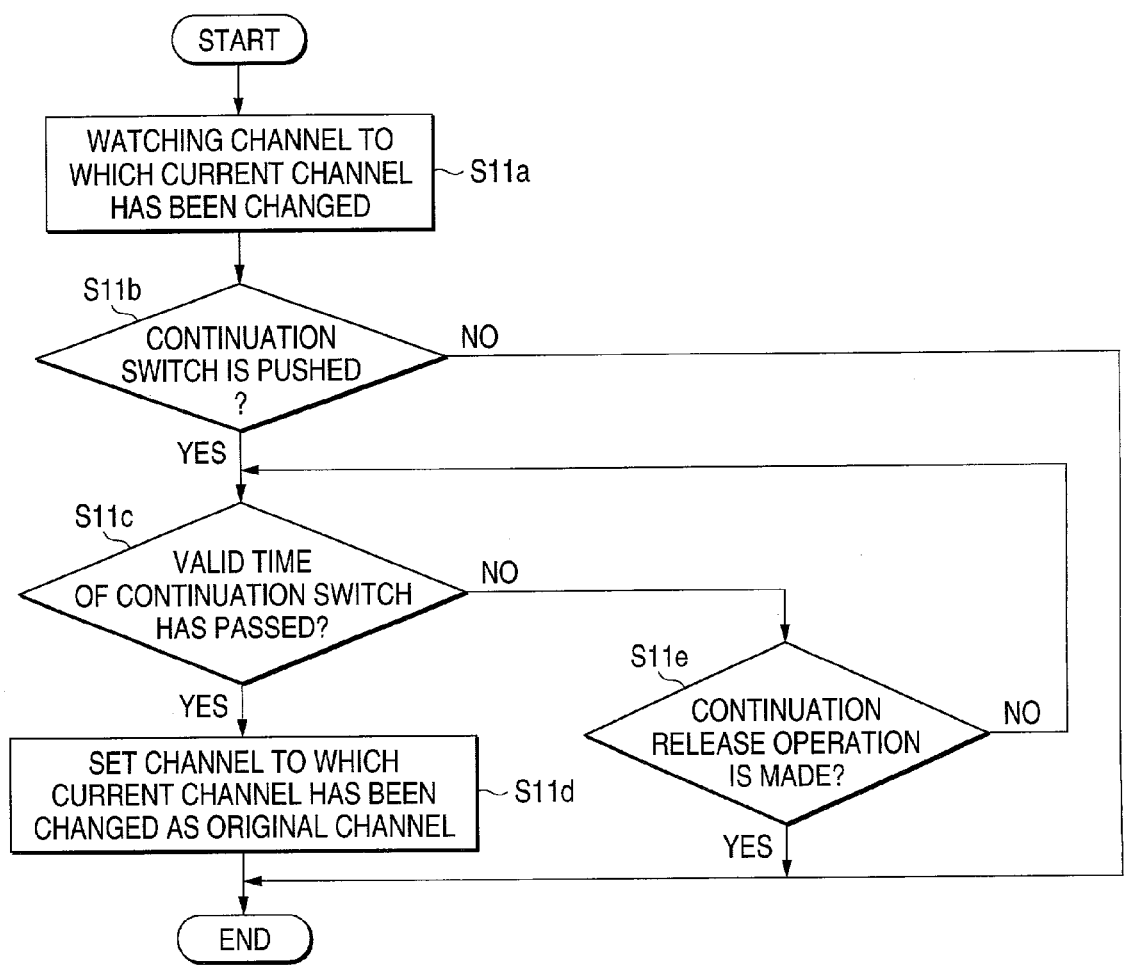
FIG. 17 is a flow chart showing the processing procedure according to another embodiment of the invention.
Figure 18:
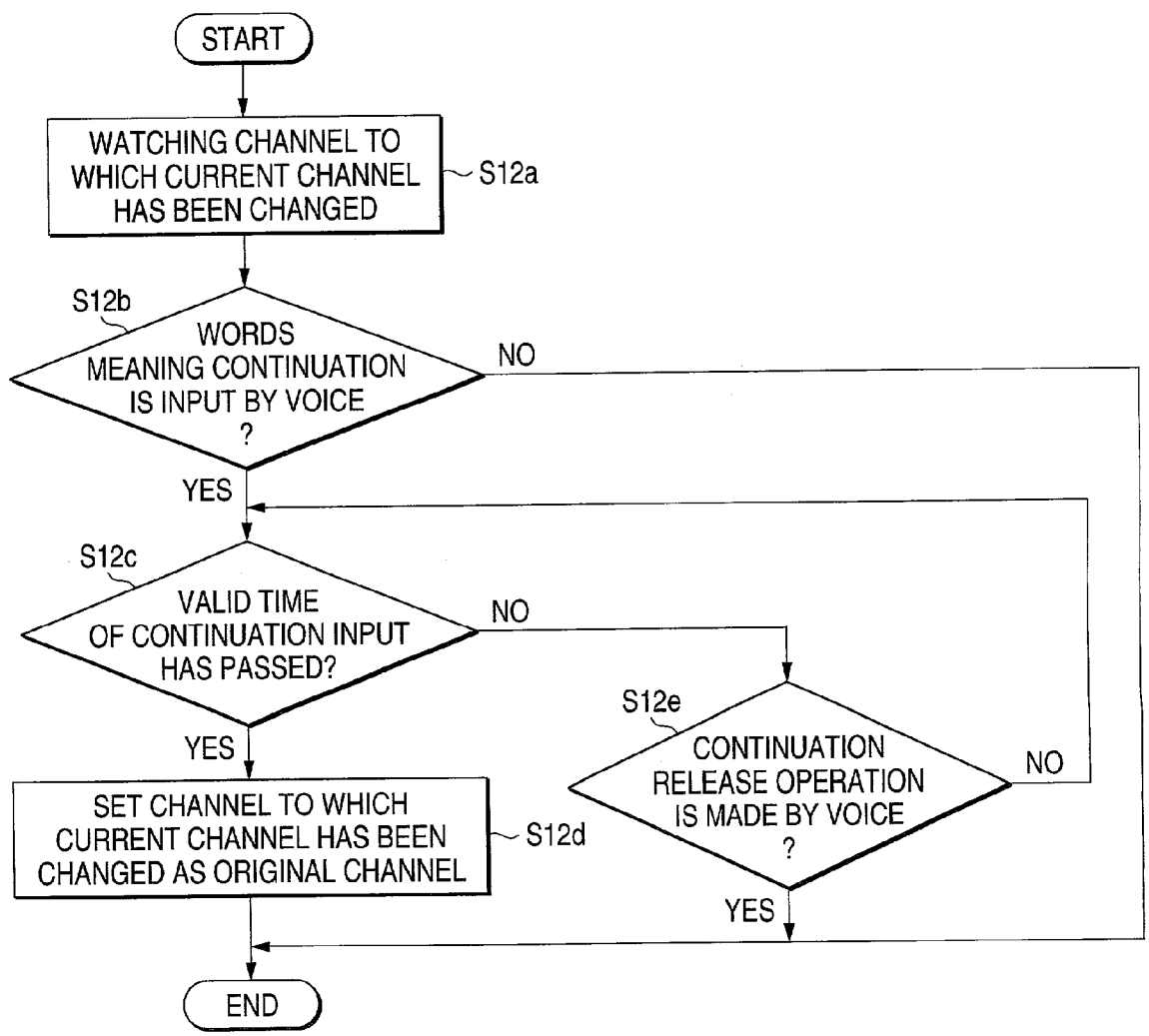
FIG. 18 is a flow chart showing the processing procedure according to another embodiment of the invention.
Figure 19:
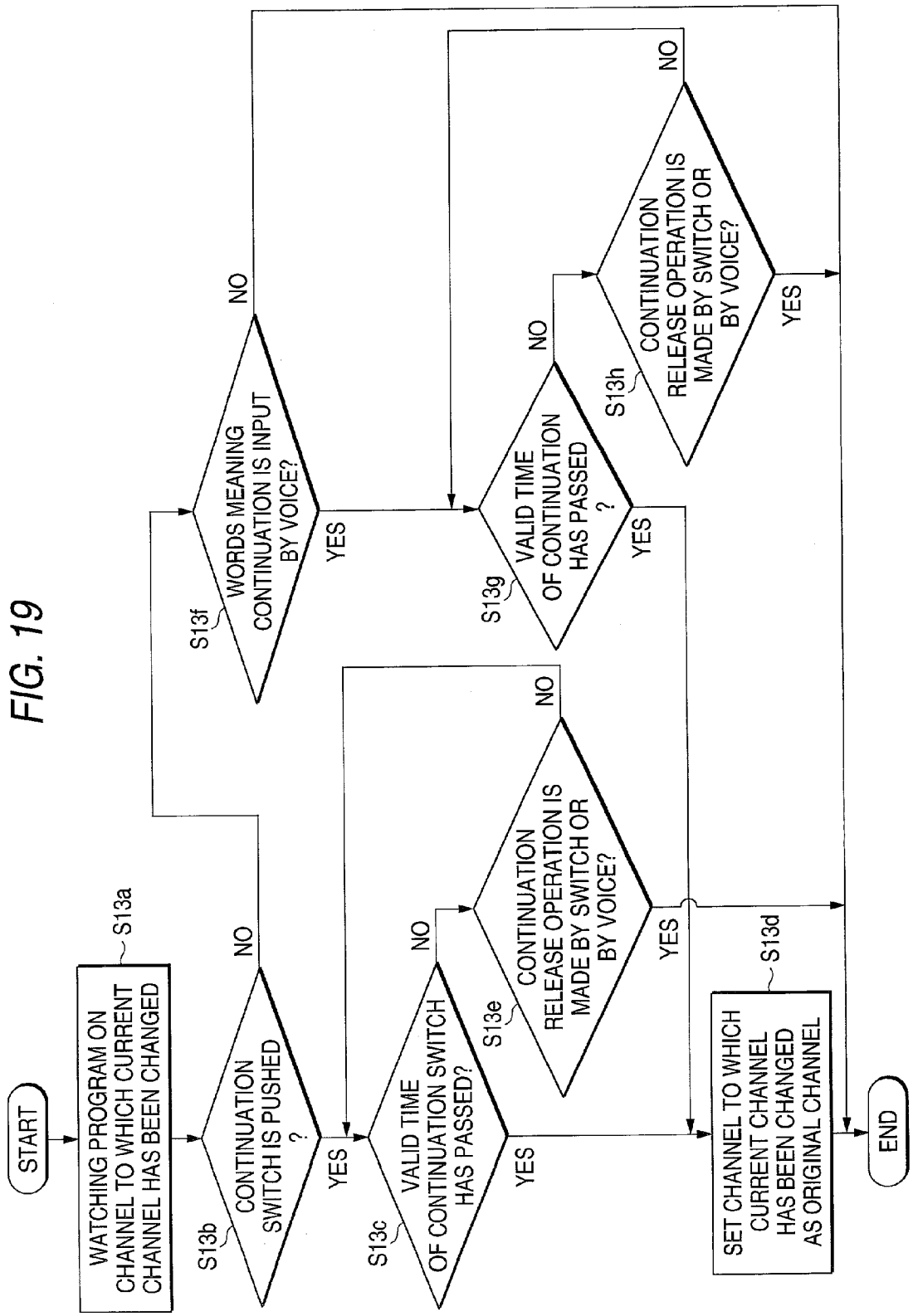
FIG. 19 is a flow chart showing the processing procedure according to another embodiment of the invention.

FIGS. 17 to 19 are flow charts showing the processing procedures of other processing examples carried out by the digital broadcasting receiver based on the block diagram of FIGS. 1, 9 or 10. Next, description will be made on these flow charts. Incidentally, these processings are carried out repeatedly when a channel to which the current channel has been changed is being watched.

(1) In the processing of FIG. 17, when the channel to which the current channel has been changed is being watched (Step S11*a*), it is judged whether a continuation switch is pushed or not (Step S11*b*). This continuation switch is provided in the switch section 5 in FIG. 1 or 9 or in the switch section 24 in FIG. 10. When this judgement result is N, the processing program is terminated. When the judgement result of Step S11*b* is Y, it is next judged whether valid time of the continuation switch has passed or not (Step S11*c*). When the judgement result of Step S11*c* is N, the processing program jumps to the processing of Step S11*e*, in which it is judged whether a continuation release operation is made or not. This continuation release operation can be carried out through the switch section 5 in FIG. 1 or 9 or in the switch section 24 in FIG. 10.

(2) When the judgement result of Step S11*e* is N, the processing program waits in Step S11*c*. When the judgement result of Step S11*e* is Y, the processing program is terminated. When the judgement result of Step S11*c* is Y, the channel to which the current channel has been changed is set as a new original channel (Step S11*d*). In such a manner, in the embodiment of FIG. 17, the channel to which the current channel has been changed is set as a new original channel when the watching time on the channel has reached a predetermined time or more since the continuation switch was pushed. On the other hand, if the watching time on the channel has not reached the predetermined time since the continuation switch was pushed, the user can prevent the channel from being set as a new original channel at the user's will.

(1) In the processing of FIG. 18, when the channel to which the current channel has been changed is being watched (Step S12*a*), it is judged whether words meaning continuation is input by voice or not (Step S12*b*). This word input is performed through the microphone 6 in FIG. 1 or 9 or through the microphone 21 in FIG. 10. When this judgement result is N, the processing program is terminated. When the judgement result of Step S12*b* is Y, it is judged whether valid time of the continuation input has passed or not (Step S12*c*).

(2) When the judgement result of Step S12*c* is N, the processing program jumps to the processing of Step S12*e*, in which it is judged whether a continuation release operation is made by voice or not. When this judgement result is N, the processing program returns to the processing of Step S12*c*. When the judgement result of Step S12*e* is Y, the processing program is terminated. When the judgement result of Step S12*c* is Y, the channel to which the current channel has been changed is set as a new original channel (Step S12d). In such a manner, in the embodiment of FIG. 18, the channel to which the current channel has been changed is set as a new original channel when the watching time on the channel has reached a predetermined time since the words meaning continuation were input. On the other hand, if the valid time of the continuation input has not passed, the user can prevent the channel from being set as a new original channel at the user's will.

(1) In the processing of FIG. 19, when the program on the channel to which the current channel has been changed is being watched (Step S13a), it is judged whether a continuation switch is pushed or not (Step S13b). When this judgement result is Y, it is next judged whether valid time of the continuation switch has passed or not (Step S13c). When the judgement result of Step S13c is Y, the channel to which the current channel has been changed is set as a new original channel (Step S13d). When the judgement result of Step S13c is N, the processing program jumps to the processing of Step S13e, in which it is judged whether a continuation release operation is made or not, that is, whether words meaning continuation release is input by voice or not, or whether a continuation release operation using a switch is made or not. When this judgement result is Y, the processing program is terminated. On the contrary, when the judgement result of Step S13e is N, the processing program waits in Step S13c.

(2) When the continuation switch is not pushed (the judgement result of Step S13b is N), it is next judged whether words meaning continuation have been input by voice or not (Step S13f) When this judgement result is N, the processing program is terminated. When the judgement result of Step S13f is Y, the processing program advances to the processing of Step S13g, in which it is judged whether valid time of the continuation input has passed or not (Step S13g). When the judgement result of Step S13g is Y, the channel to which the current channel has been changed is set as a new original channel (Step S13d). When the judgement result of Step S13g is N, the processing program advances to the processing of Step S13h, in which it is judged whether a continuation release operation is made or not, that is, whether words meaning continuation release is input by voice or not, or whether a continuation release operation using a switch is made or not. When this judgement result is Y, the processing program is terminated. On the contrary, when the judgement result of Step S13h is N, the processing program waits in Step S13g.

In the embodiment of FIG. 19, the channel to which the current channel has been changed is set as a new original channel when the watching time of the channel has reached a predetermined time or more since the continuation switch was pushed or the words meaning continuation were input by voice. In such a manner, the continuation switch or the microphone used for voice input has a function as an instruction section for giving an instruction to continue to watch the channel to which the current channel has been changed. Also in the embodiment of FIG. 19, when the valid time of the continuation switch or the valid time of the continuation input has not passed, the user can prevent the channel from being set as a new original channel at the user's will.

Figure 20:
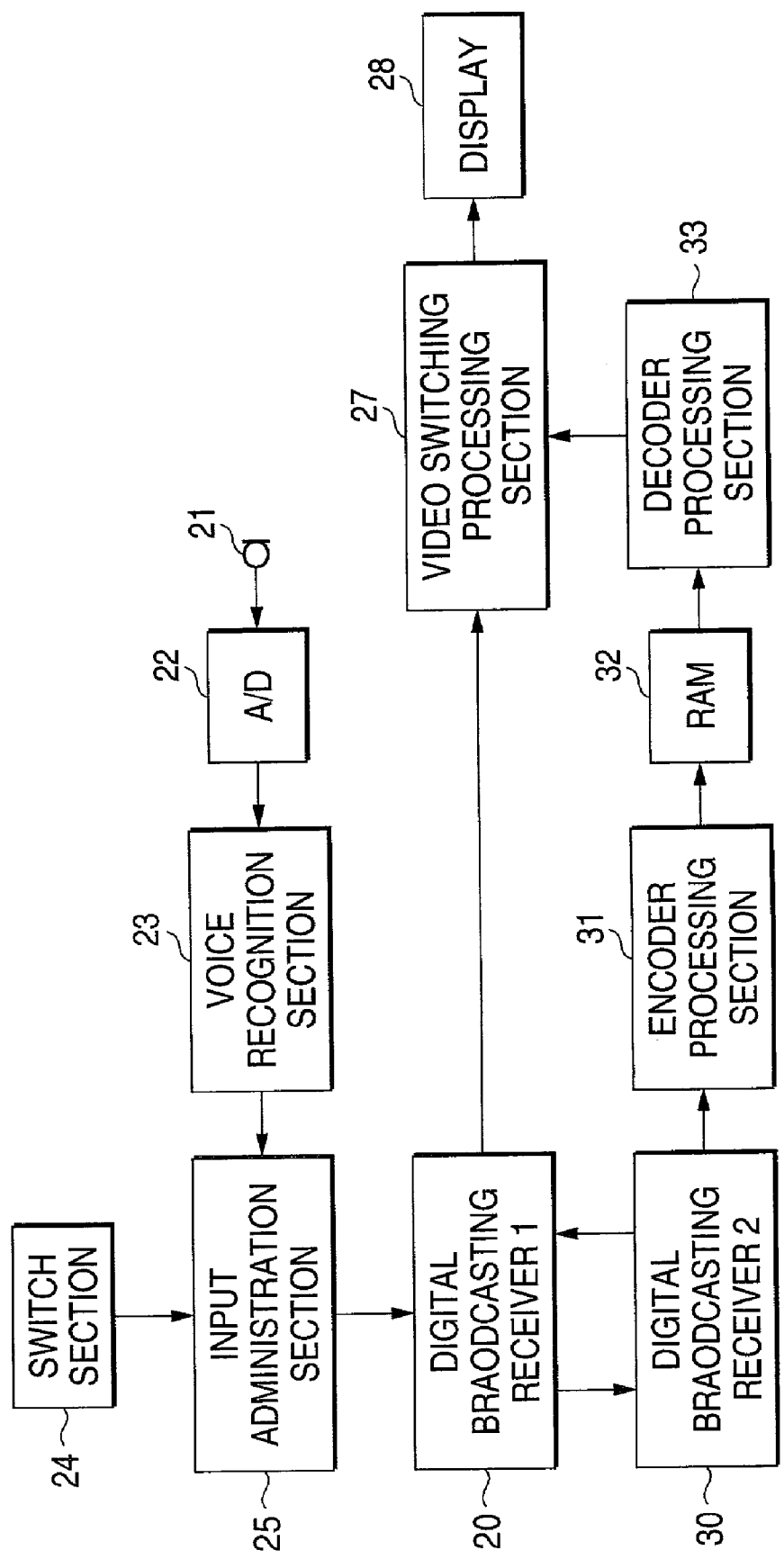
FIG. 20 is a block diagram showing an example of the system configuration according to another embodiment of the invention.

FIG. 20 is a block diagram showing the system configuration according to another embodiment of the invention. Also in the embodiment of FIG. 20, two digital broadcasting receivers, that is, a first digital broadcasting receiver-1 and a second digital broadcasting receiver 2 are used in the same manner as in the embodiment shown in FIG. 10. The configuration in which the microphone 21 to the display 28 are connected to the first digital broadcasting receiver 1 is identical to that in FIG. 10. In the second digital broadcasting receiver 2, an encoder processing section 31 is connected thereto, and an RAM 32 and a decoder processing section 33 are further provided.

In the embodiment of FIG. 20, when the current channel is changed from one channel to another channel because a commercial message is broadcast on the one channel while the user is watching by the first digital broadcasting receiver 1, a video image on the one channel which has been watched in the first digital broadcasting receiver 1 is encoded by the encoder processing section 31 and recorded in the RAM 32 in the second digital broadcasting receiver 2. Then, the video image recorded in the RAM 32 is decoded by the decoder processing section 33 and reproduced on the display. Accordingly, even when the watching time on the another channel is prolonged so that the user delays returning the current channel to the one channel, the user can avoid missing the program which was watched on the one channel before the channel change.

Figure 21:
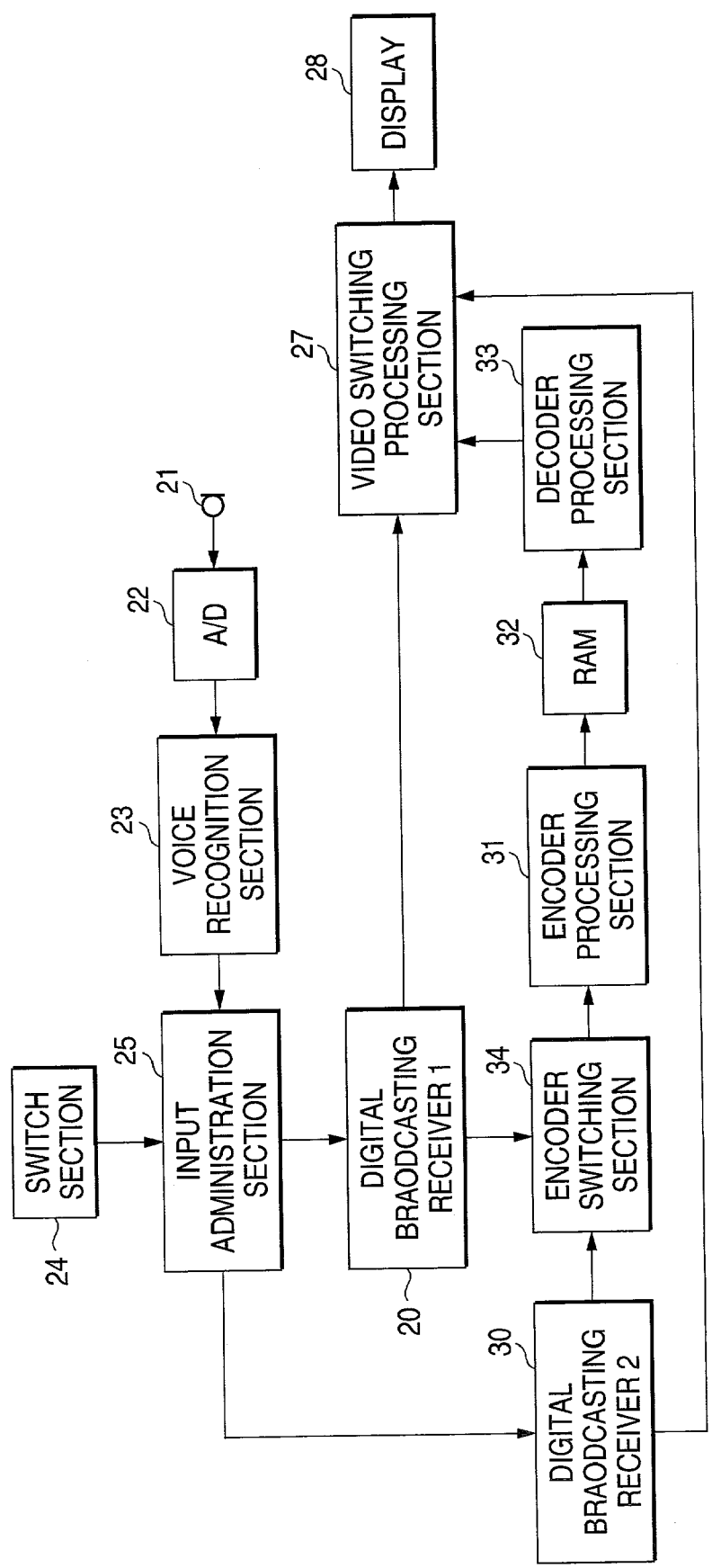
FIG. 21 is a block diagram showing an example of the system configuration according to another embodiment of the invention.

FIG. 21 is a block diagram showing the system configuration according to another embodiment of the invention. In the embodiment of FIG. 21, an encoder switching section 34 is provided. Assume that the user usually watches digital broadcasting on the first digital broadcasting receiver 1. Then, the encoder switching section 34 makes control to encode, according to priority, a video image of digital broadcasting received by the first digital broadcasting receiver 1. When a commercial message starts in the first digital broadcasting receiver 1, the first digital broadcasting receiver 1 performs recording and another channel to which the current channel is changed is displayed on the display 28 by the second digital broadcasting receiver 2.

Figure 22:
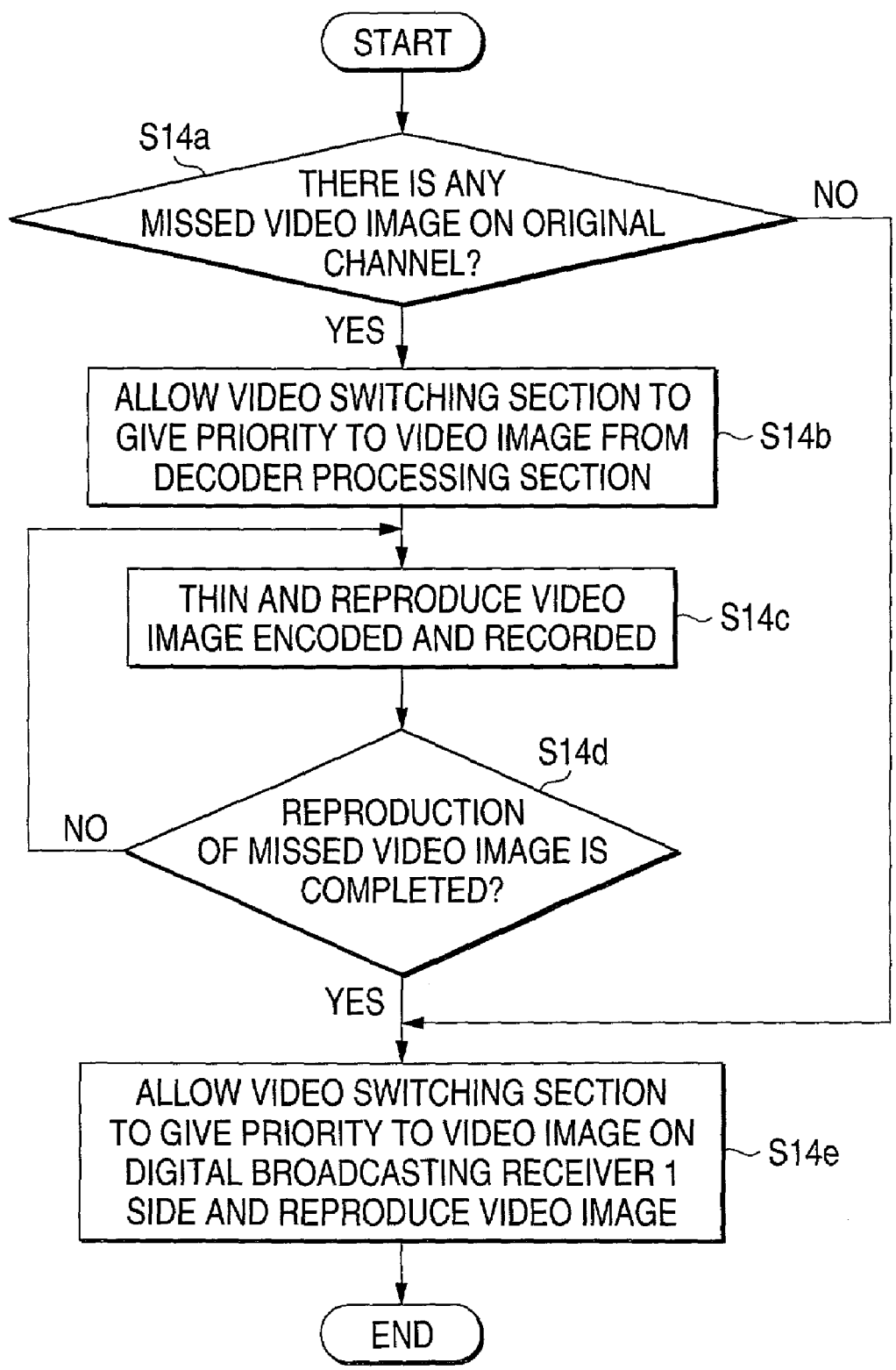
FIG. 22 is a flow chart showing the processing procedure according to another embodiment of the invention.
Figure 23:
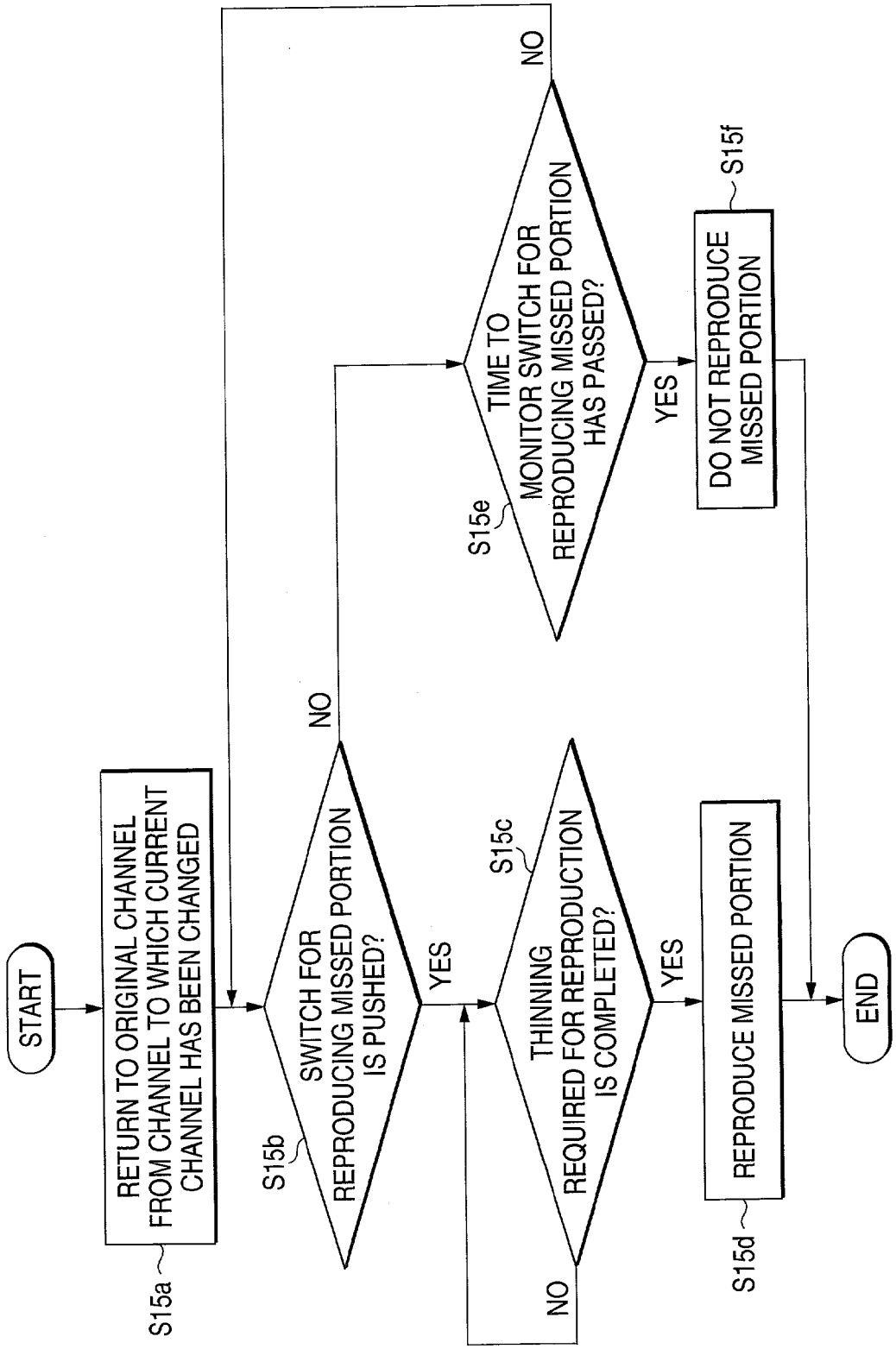
FIG. 23 is a flow chart showing the processing procedure according to another embodiment of the invention.
Figure 24:
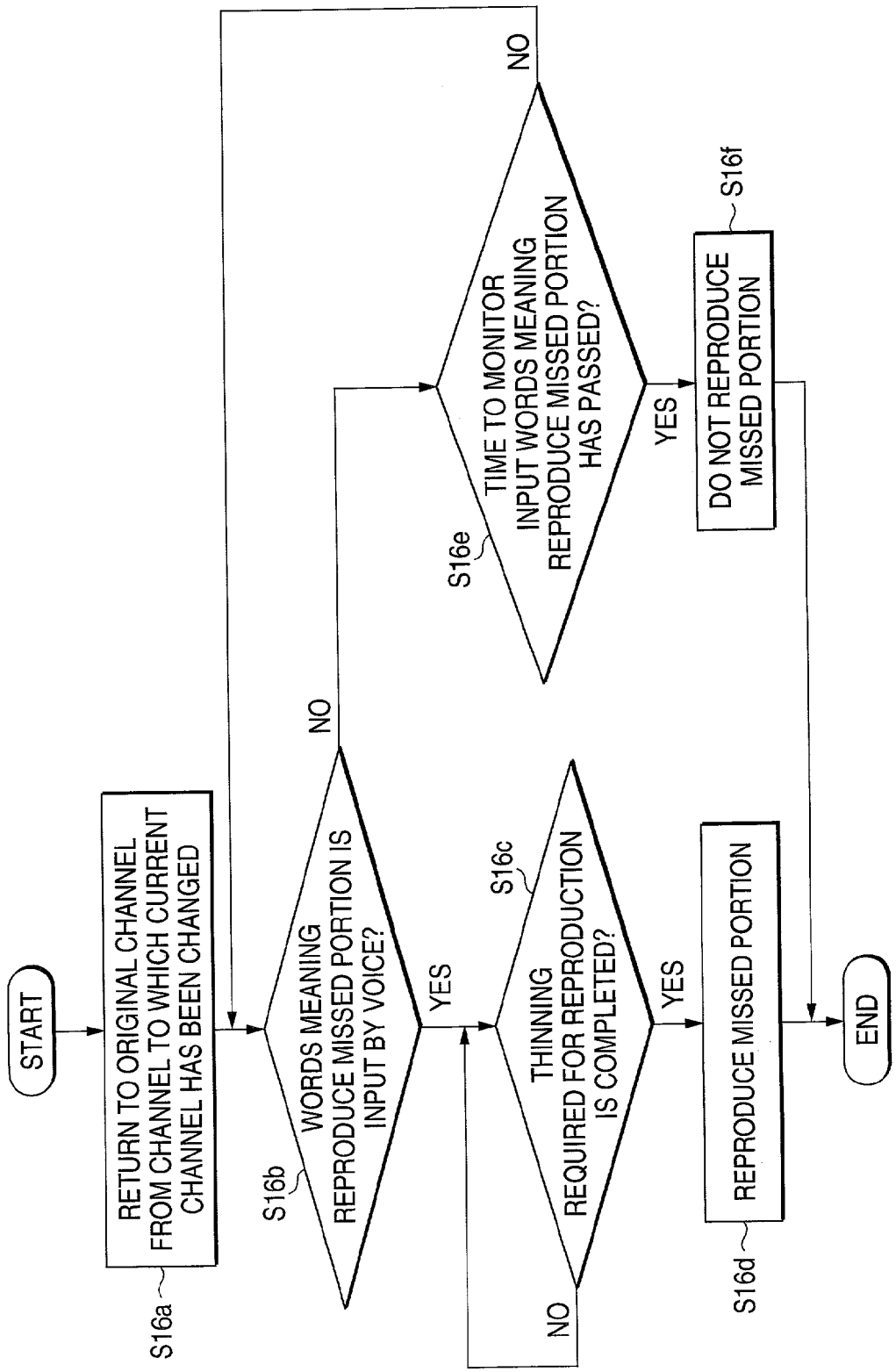
FIG. 24 is a flow chart showing the processing procedure according to another embodiment of the invention.
Figure 25:
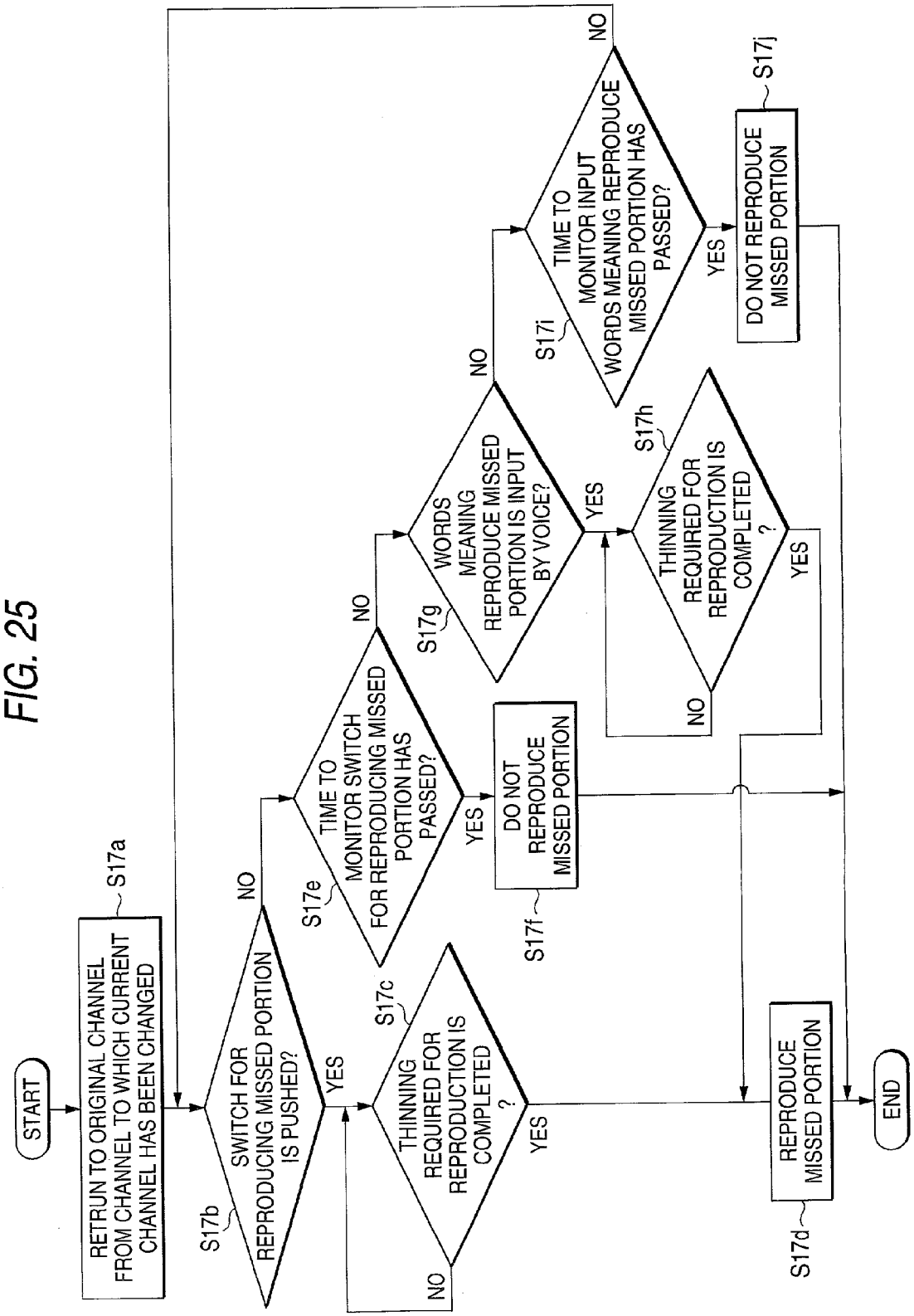
FIG. 25 is a flow chart showing the processing procedure according to another embodiment of the invention.

Each of FIGS. 22 to 25 is a flow chart showing the processing procedure of a processing example carried out by the digital broadcasting receiver based on the block diagram of FIG. 20 or 21. Incidentally, processing in FIG. 22 is carried out when the current channel is changed from an original channel to another channel, and each processing of FIGS. 23 to 25 is carried out when the current channel is returned to the original channel from the another channel. Next, description will be made on these flow charts.

(1) In FIG. 22, assume that the current channel is changed to the another channel when a program on the original channel is being watched in the digital broadcasting receiver 1. At this time, it is judged whether there is a missed video image on the original channel or not (Step S14a). An average difference between images on two screens, an audio level and so on, are used and compared as criteria for the judgement. Alternatively, the judgement may be made on the basis of a time in data broadcasting.

(2) When there is a missed video image on the original channel (the judgement result of Step S14a is Y), a video switching section gives priority to a video image on the decoder processing section side (Step S14b). That is, the video switching section gives priority to the video image of the digital broadcasting receiver (the second digital broadcasting receiver 2 in the embodiment of FIG. 20, or the first digital broadcasting receiver 1 in the embodiment of FIG. 21) recording the video image of the original channel. Next, the video image encoded and recorded is thinned and reproduced (Step S14c). Accordingly, the video image can be reproduced at a higher speed than normal. However, when the video image is thinned and recorded in the encoder processing section, thinning is not required in Step S14c.

(3) Next, it is judged whether the reproduction of the missed video image is completed or not (Step S14d). When this judgement result is N, the processing program returns to the processing of Step S14c, and repeats the loop processing of Step S14c and Step S14d. When the judgement result of Step S14d is Y, the video switching section gives priority to the video image on the first digital broadcasting receiver 1 side and reproduces the video image (Step S14e). Incidentally, also when it is concluded in Step S14a that there is no missed video image on the original channel, the processing program jumps to the processing of Step S14e.

(1) In FIG. 23, the current channel is returned to an original channel from another channel (Step S15a). Next, it is judged whether a switch for reproducing a missed portion is pushed or not (Step S15b). This switch for reproducing a missed portion is provided in the switch section 24 in FIG. 20 or 21. When the judgement result of Step S15b is Y, the processing program advances to the processing of Step S15c. In the processing of Step S15c, it is judged whether thinning required for the reproduction is completed or not. The time when the thinning is completed may be designated as the time when a predetermined time has passed since the switch for reproducing a missed portion was operated. In this case, the predetermined time is set by a timer in consideration of the time required for editing such as thinning a recorded video image. Then, the processing program waits in Step S15c till the thinning is completed. After the thinning is completed (the judgement result of Step S15c is Y), the missed portion is reproduced retroactively (Step S15d). Incidentally, either a method in which reproduction is started after the thinning is completed perfectly or a method in which reproduction is started when the thinning is carried out to some extent and after that reproduction is carried out in parallel with the processing of the thinning, can be adopted for the reproduction of the missed video image.

(2) When the judgement result of Step S15b is N, the processing program jumps to the processing of Step S15e, in which it is judged whether the time to monitor the switch for reproducing a missed portion has passed or not. The processing of Step S15e is to judge the time counted by the timer IC in FIG. 1 or a timer built in the CPU of the digital broadcasting receiver. When this judgement result is N, the processing program waits in Step S15b. When the judgement result of Step S15e is Y, the missed portion is not reproduced in the processing of Step S15f, and the processing program is terminated. In such a manner, in the embodiment of FIG. 23, a time limit is provided for the operation of the switch for reproducing a missed portion. Then, when the switch for reproducing a missed portion is not operated within a predetermined time, the missed portion is regarded as being not reproduced. Thus, the processing of reproduction is prevented from being delayed.

(1) In FIG. 24, the current channel is returned to an original channel from another channel (Step S16a). Next, it is judged whether words meaning "reproduce a missed portion" have been input by voice or not (Step S16b). This voice input is carried out through the microphone 21 in FIG. 20 or 21. When this judgement result is Y, the processing program advances to the processing of Step S16c, in which it is judged whether thinning required for reproduction is completed or not. The time when the thinning is completed may be designated as the time when a predetermined time has passed since the switch for reproducing a missed portion was operated. In this case, the predetermined time is set by a timer in consideration of the time required for editing such as thinning a recorded video image. Then, the processing program waits in Step S16c till the thinning is completed. After the thinning is completed (the judgement result of Step S16c is Y), the missed portion is reproduced retroactively (Step S16d). Incidentally, as shown in the embodiment of FIG. 23, either a method in which reproduction is started after the thinning is completed perfectly or a method in which reproduction is started when the thinning is carried out to some extent and after that reproduction is carried out in parallel with the processing of the thinning, can be adopted for the reproduction of the missed video image.

(2) When the judgement result of Step S16b is N, the processing program jumps to the processing of Step S16e, in which it is judged whether the time to monitor the input of the words to reproduce a missed portion has passed or not. When this judgement result is N, the processing program waits in Step S16b. When the judgement result of Step S16e is Y, the missed portion is not reproduced in the processing of Step S16f, and the processing program is terminated. In such a manner, in the embodiment of FIG. 24, a time limit is provided for the input of the words to reproduce a missed portion. When the words to reproduce a missed portion are not input within a predetermined time, the missed portion is regarded as being not reproduced. Thus, the processing of reproduction is prevented from being delayed.

(1) In FIG. 25, the current channel is returned to an original channel from another channel (Step S17a). Next, it is judged whether a switch for reproducing a missed portion is pushed or not (Step S17b). When this judgement result is Y, it is next judged whether thinning required for reproduction is completed or not (Step S17c). The processing program waits in Step S17c till the thinning is completed. After the thinning is completed (the judgement result of Step S15c is Y), the missed portion is reproduced (Step S17d).

(2) When the judgement result of Step S17b is N, the processing program jumps to the processing of Step S17e, in which it is judged whether the time to monitor the switch for reproducing a missed portion has passed or not. When the judgement result of Step S17e is Y, the missed portion is not reproduced in the processing of Step S17f, and the processing program is terminated. When the judgement result of Step S17e is N, it is next judged whether words meaning "reproduce a missed portion" have been input by voice or not (Step S17g) When the judgement result of Step S17g is Y, the processing program advances to the processing of Step S17h, in which it is judged whether thinning required for reproduction has been completed or not. The processing program waits in Step S17h till the thinning is completed. After the thinning is completed (the judgement result of Step S17h is Y), the missed portion is reproduced retroactively (Step S17d).

(3) When the judgement result of Step S17g is N, the processing program jumps to the processing of Step S17i, in which it is judged whether the time to monitor the input of the words to reproduce a missed portion has passed or not. When this judgement result is N, the processing program waits in Step S17b. When the judgement result of Step S17i is Y, the missed portion is not reproduced in the processing of Step S17j, and the processing program is terminated. In the embodiment of FIG. 25, the processing of thinning in Step S17c and Step S17h is performed in the same manner as the processing described in Step S15c in FIG. 23 or in Step S16c in FIG. 24. In such a manner, in the embodiment of FIG. 25, it is judged whether the time to monitor the switch for reproducing a missed portion has passed or not and whether the time to monitor the input of the words to reproduce a missed portion has passed or not. When the operation is not carried out by the user within a predetermined time, the missed portion is regarded as being not reproduced. Thus, the processing of reproduction is prevented from being delayed.

As described previously, in the embodiment of FIG. 22, when the current channel is returned to an original channel from another channel, a video image of a missed portion on the original channel is reproduced automatically. On the other hand, in each of the embodiments of FIGS. 23 to 25, the user operates a switch or inputs a voice so as to determine whether to reproduce the video image of the missed portion or not. Accordingly, the user can determine, at the user's will, whether to reproduce the video image of the missed portion in accordance with a condition such as the program contents.

Figure 26:
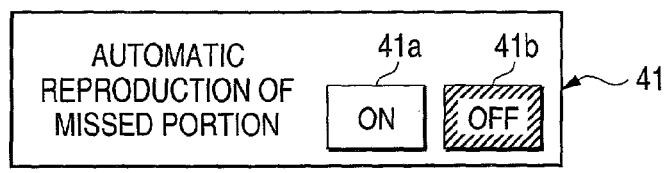
FIG. 26 is an explanatory view showing the configuration according to another embodiment of the invention.

FIG. 26 is an explanatory view showing the configuration in which the user can set whether to automatically reproduce a missed portion broadcast on an original channel when the current channel is returned to the original channel from another channel. Although the digital broadcasting receiver 1 has a function as a computer in this embodiment, an information terminal such as a personal computer may be connected to the digital broadcasting receiver 1.

In FIG. 26, characters indicating "automatic reproduction of missed portion" are displayed on a screen 41. In addition, icons 41a and 41b of "ON" and "OFF" are displayed. The user chooses one of the icons through a mouse or a joystick so as to set the validity of the automatic reproduction of a missed portion. In such a manner, in the embodiment of FIG. 26, the setting is done using GUI.

Figure 27:
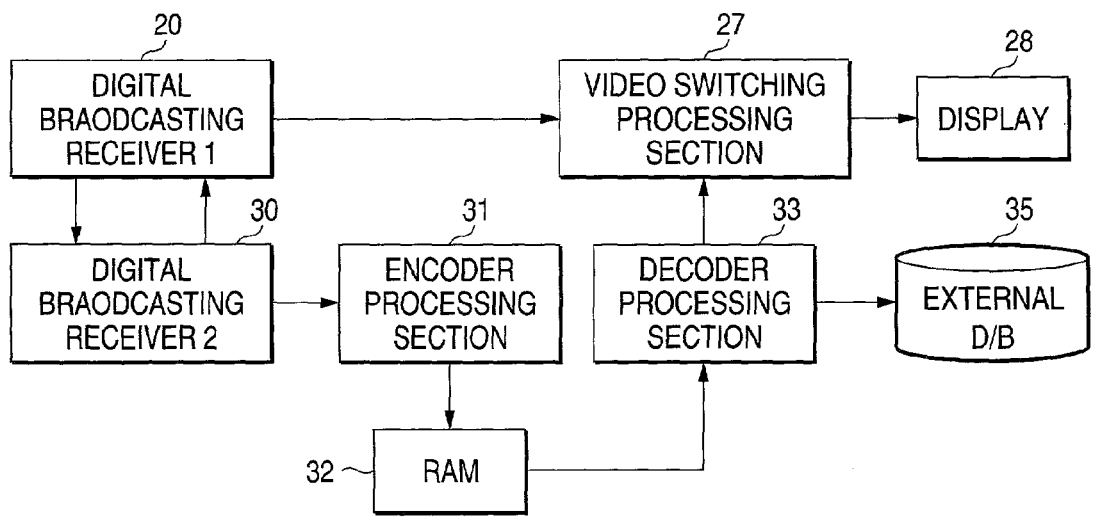
FIG. 27 is a block diagram showing an example of the system configuration according to another embodiment of the invention.

FIG. 27 is a block diagram showing the system configuration according to another embodiment of the invention. In the embodiment of FIG. 27, an external database (D/B) 35 constituted by a magnetic hard disk unit or the like is provided. This external D/B 35 stores a set value of the reproduction time to retroactively watch a missed portion of the program.

Figure 28:
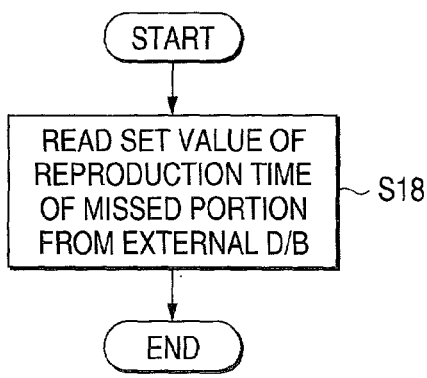
FIG. 28 is a flow chart showing the processing procedure according to another embodiment of the invention.

FIG. 28 is a flow chart showing the processing procedure for the external D/B in FIG. 27. In FIG. 28, the set value of the reproduction time is read from the external D/B in the processing of Step S18 when the missed portion is reproduced.

Figure 29:
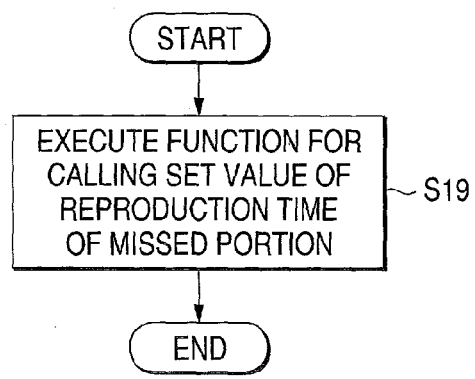
FIG. 29 is a flow chart showing the processing procedure according to another embodiment of the invention.

FIG. 29 is a flow chart showing the processing procedure according to another embodiment of the invention. In this processing, the reproduction time of a missed portion is embedded in a processing program in advance, and a function (command) for calling the reproduction time of the missed portion is executed in Step S19 when the missed portion is reproduced.

Initial setting of the reproduction time of the missed portion is done by providing the external D/B 35 as shown in FIG. 27 or by embedding the reproduction time of the missed portion in a processing program in advance as shown in FIG. 29. Accordingly, when the missed portion is reproduced automatically or by the operation of the user as shown in FIGS. 22 to 25, the reproduction time is set automatically. Thus, the processing of setting the reproduction time of the missed portion is simplified.

Figure 30:
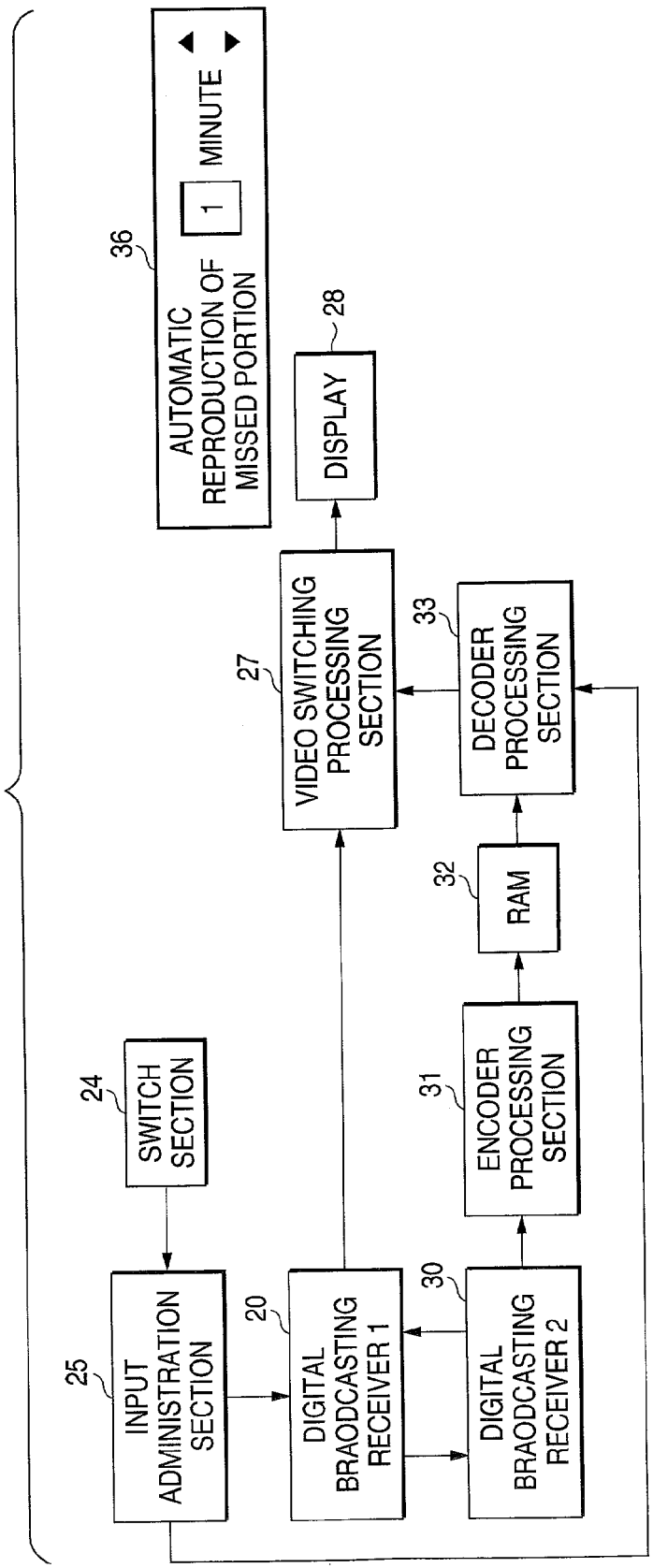
FIG. 30 is a block diagram showing an example of the system configuration according to another embodiment of the invention.

FIG. 30 is a block diagram showing the system configuration according to another embodiment of the invention. In this embodiment, the setting of the reproduction time to reproduce a missed portion of a program is displayed on a screen 36. On this screen 36, characters indicating "automatic reproduction of missed portion", and icons for scrolling the reproduction time by minute are displayed so that the reproduction time is set by use of GUI. The user uses the icons to scroll and set the reproduction time by minute. Alternatively, the user may use a ten-key keyboard to input the reproduction time.

When a switch for reproducing a missed portion is pushed to set the reproduction time, an input administration section 25 sends a signal to a decoder processing section 33. The decoder processing section 33 extracts a missed portion corresponding to the set reproduction time from the digital broadcasting on the original channel recorded by the digital broadcasting receiver 2, and supplies the extracted portion to a video switching processing section 27. The video image of the digital broadcasting portion corresponding to the reproduction time is displayed on a display 28.

Figure 31:
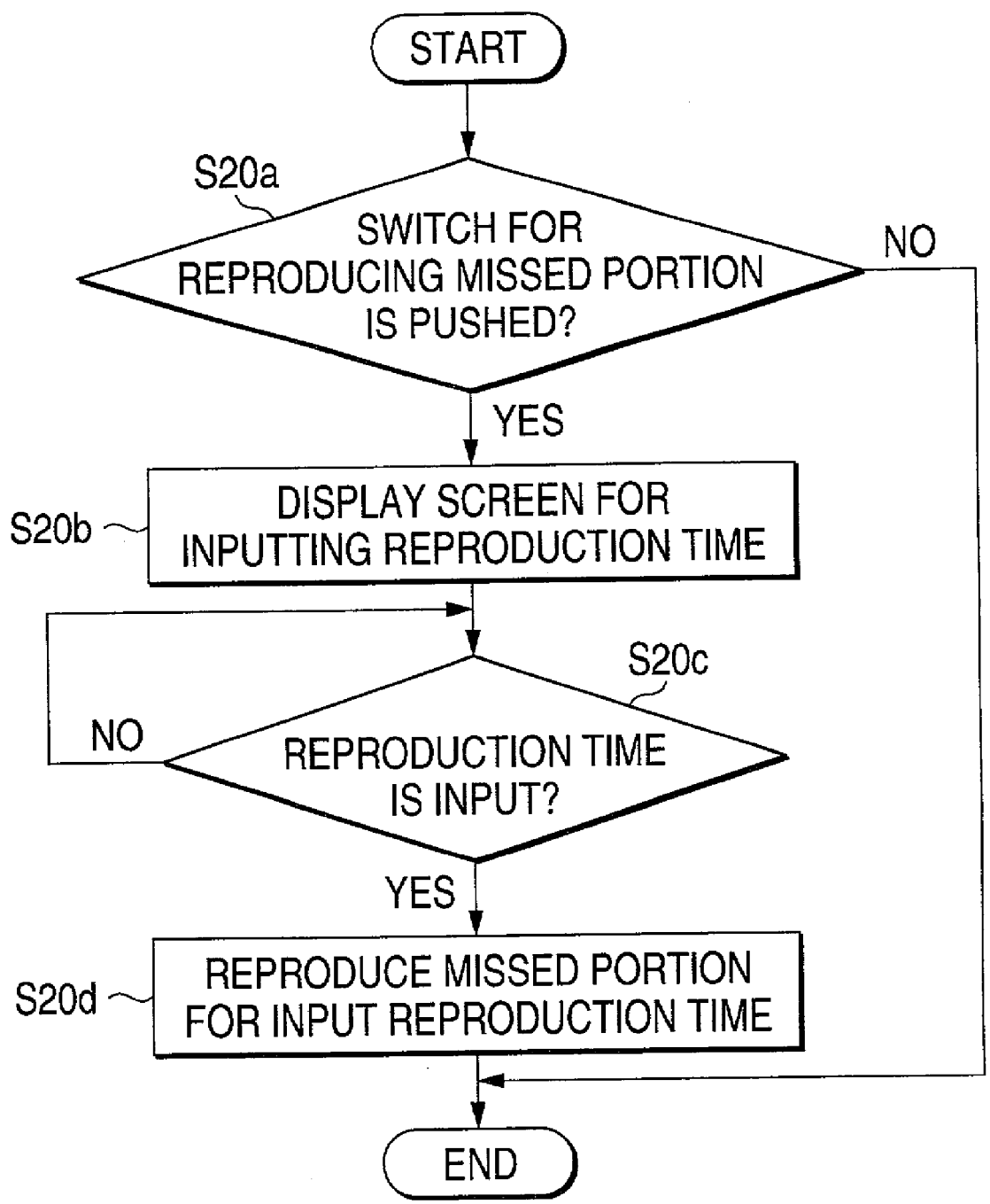
FIG. 31 is a flow chart showing the processing procedure according to another embodiment of the invention.

FIG. 31 is a flow chart showing the processing procedure according to the embodiment of the invention using the configuration of FIG. 30. Next, description will be made on this flow chart. Incidentally, this processing is executed repeatedly together with other processings during other operations of the digital broadcasting receiver.

It is judged whether the switch for reproducing a missed portion is pushed or not (Step S20a). When this judgement result is N, the processing program is terminated. When the judgement result of Step S20a is Y, a screen for inputting the reproduction time (the screen 36 in FIG. 30) is displayed. Subsequently, it is judged whether the reproduction time is input or not (Step S20c). When this judgement result is N, the processing program waits in Step S20c. When the reproduction time is input (the judgement result of Step S20c is Y), the missed portion is reproduced for the input reproduction time (Step S20d).

Figure 32:
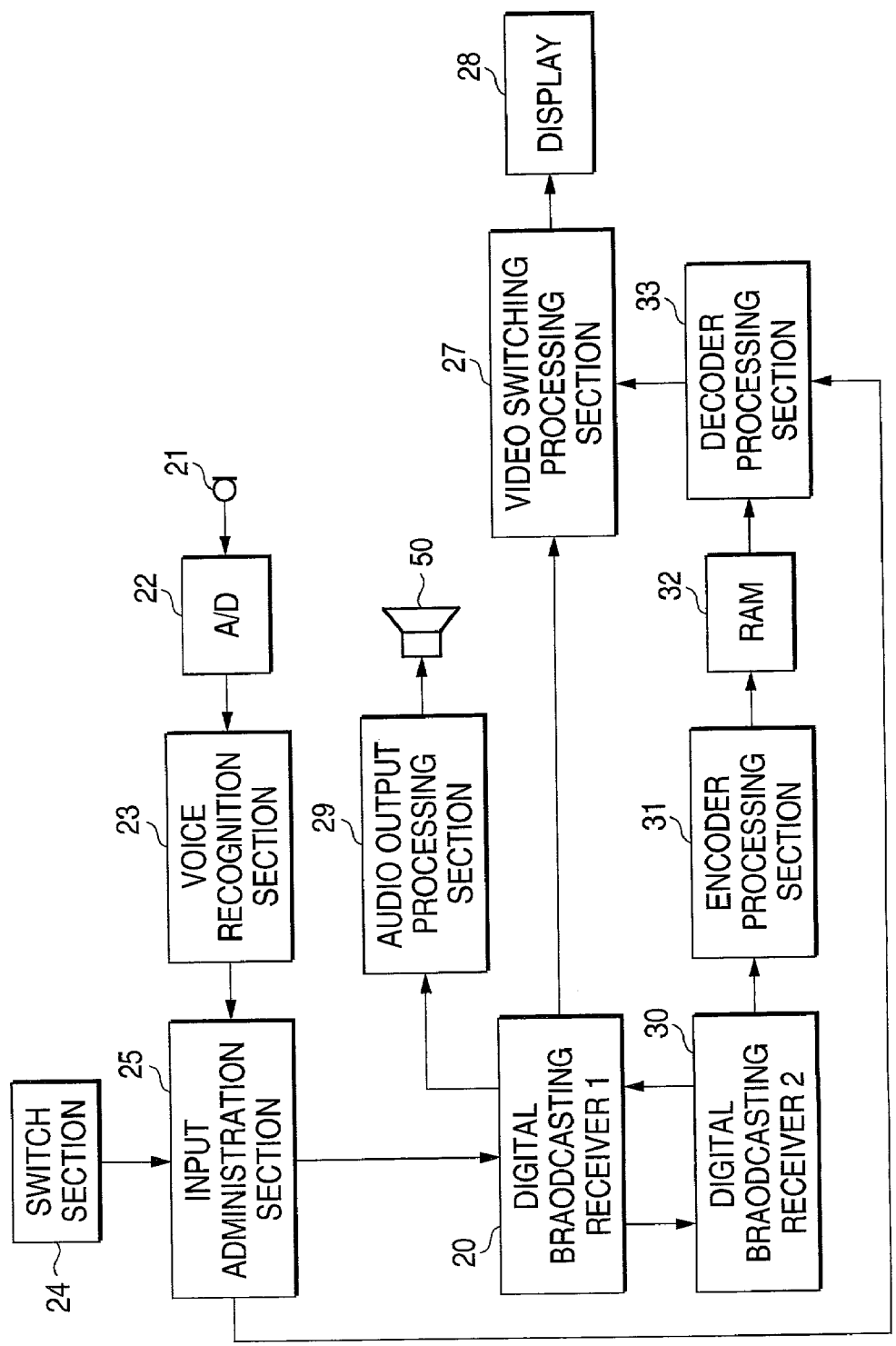
FIG. 32 is a block diagram showing an example of the system configuration according to another embodiment of the invention.

FIG. 32 is a block diagram showing the system configuration according to another embodiment of the invention. In the embodiment of FIG. 32, a microphone 21, an A/D converter 22, a voice recognition section 23, an audio output processing section 29 and a speaker 50 are added to the configuration of FIG. 30. Description on the screen 36 for inputting the reproduction time in FIG. 30 is omitted. The audio output processing section 29 forms a message indicating "tell reproduction time" or the like, and outputs the message from the speaker 50.

Figure 33:
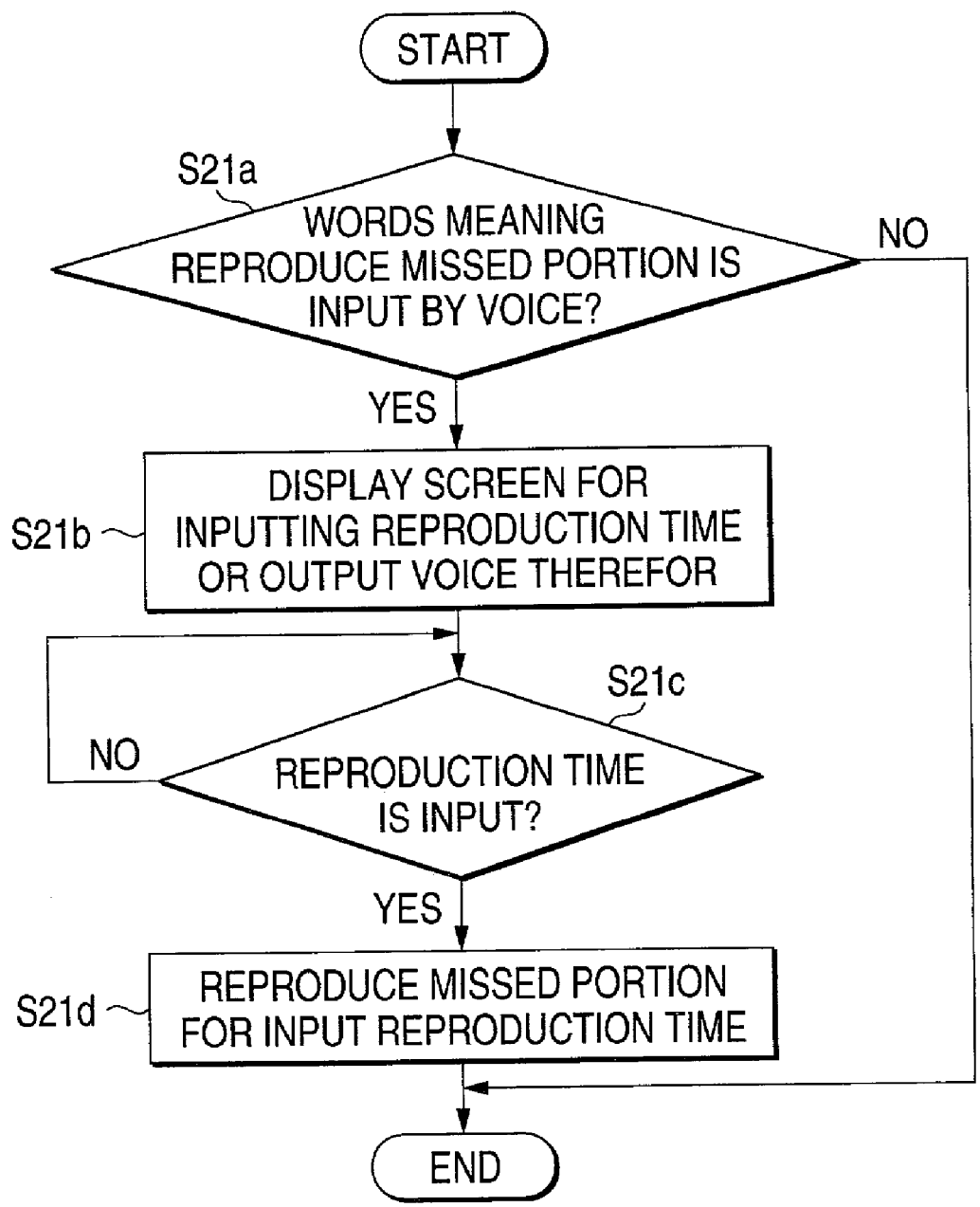
FIG. 33 is a flow chart showing the processing procedure according to another embodiment of the invention.

FIG. 33 is a flow chart showing the processing procedure according to an embodiment of the invention using the configuration of FIG. 32. Next, description will be made on this flow chart. Incidentally, this processing is executed repeatedly together with other processings during other operations of the digital broadcasting receiver.

(1) It is judged whether words meaning "reproduce a missed portion" are input by voice or not (Step S21a). This voice is input through the microphone 21. When this judgement result is N, the processing program is terminated. When the judgement result of Step S21a is Y, a screen for inputting the reproduction time is displayed. Alternatively, the voice output to the audio output processing section for inputting the reproduction time is made valid (Step S21b).

(2) Subsequently, it is judged whether the reproduction time is input or not (Step S21c). When this judgement result is N, the processing program waits in Step S21c. When the reproduction time is input (the judgement result of Step S21c is Y), the missed portion is reproduced for the input reproduction time (Step S21d).

Figure 34:
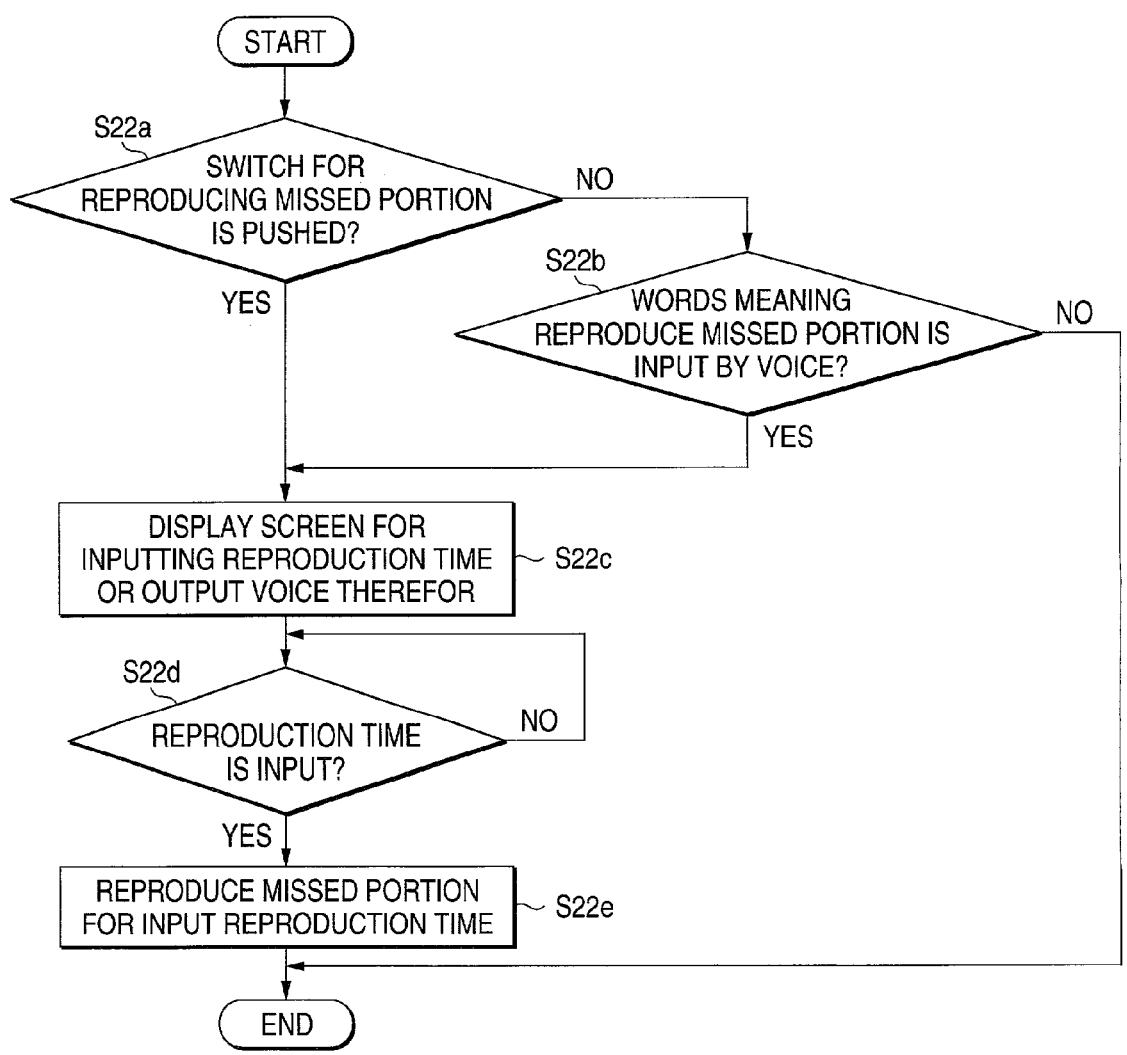
FIG. 34 is a flow chart showing the processing procedure according to another embodiment of the invention.

FIG. 34 is a flow chart showing the processing procedure according to another embodiment of the invention using the configuration of FIG. 32. Next, description will be made on this flow chart. Incidentally, this processing is executed repeatedly together with other processings of the digital broadcasting receiver.

(1) It is judged whether the switch for reproducing a missed portion is pushed or not (Step S22a). When this judgement result is N, it is next judged whether words meaning reproduce a missed portion are input by voice or not (Step S22b). When this judgement result is N, the processing program is terminated. When the switch for reproducing a missed portion is pushed (the judgement result of Step S22a is Y) or when the words are input (the judgement result of Step S22b is Y), the processing program advances to the processing of Step S22c.

(2) In the processing of Step S22c, a screen for inputting the reproduction time is displayed. Alternatively, the voice output to the audio output processing section for inputting the reproduction time is made valid. Next, it is judged whether the reproduction time is input or not (Step S22d). When this judgement result is N, the processing program waits in Step S22d. When the reproduction time is input (the judgement result of Step S22d is Y), the missed portion is reproduced for the input reproduction time (Step S22e).

According to the embodiments of FIGS. 30 to 34, the user can set the reproduction time in accordance with the preference of the user or the situation of a program. Thus, the missed portion can be reproduced at the will of the user in accordance with the program contents or the like.

Figure 35:
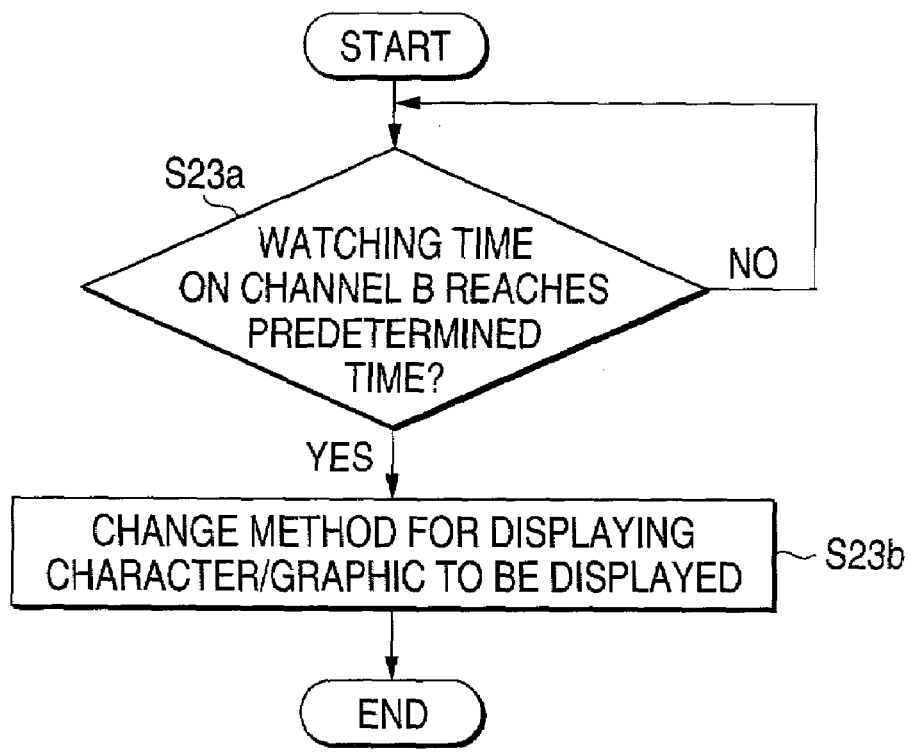
FIG. 35 is a flow chart showing the processing procedure according to another embodiment of the invention.

FIG. 35 is a flow chart showing the processing procedure according to another embodiment of the invention. Next, description will be made on this flow chart. Incidentally, this processing is executed repeatedly together with other processings during the operation of the digital broadcasting receiver. In this embodiment, it is judged whether the watching time on a channel B reaches a predetermined time or not after the current channel was changed from a channel A to the channel B (Step S23a). When this judgement-result is N, the processing program is terminated. Actually, since this processing is carried out repeatedly, the processing program waits in Step S23a. When the judgement result of Step 23a is Y, a method for displaying character/graphic to be displayed is changed (Step S23b).

In the embodiment of FIG. 35, the method for displaying character/graphic to be display, that is, the kind of character font, the character decoration, the size of character/graphic, or the like, is changed in the processing of Step S23b. Accordingly, the user is visually notified that the watching time on the channel B reaches a predetermined time. Thus, the attention of the user can be drawn to return the current channel to the channel A.

Figure 36:
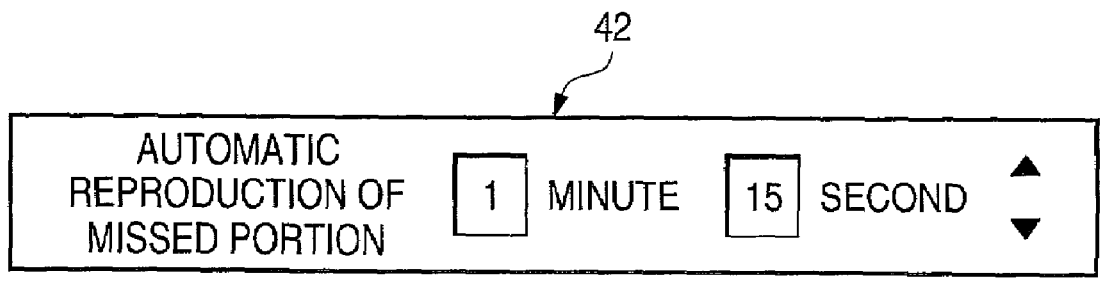
FIG. 36 is an explanatory view showing the configuration according to another embodiment of the invention.

FIG. 36 is an explanatory view showing another embodiment for setting the reproduction time. Although the reproduction time is set using GUI in the same manner as in the embodiment of FIG. 30, the icons displayed on the screen 42 for setting the time is designed so that the time can be set by second in the embodiment of FIG. 16. Incidentally, the setting unit may be one second. For example, the setting unit may be 15 seconds.

The embodiments of the invention have been described with reference to the respective flow charts. The invention may contain other embodiments obtained by using the processing procedures of these flow charts in combination suitably. For example, it is possible to arrange an embodiment in combination of the processing of changing the current channel to another channel on which a commercial message is not broadcast as described in the flow chart of FIG. 16, the processing of reproducing a missed portion when the current channel is returned to the original channel from the another channel as described in FIG. 25, and the processing of setting the reproduction time as described in FIG. 34. When the processings described in the respective flow charts are combined thus, various requests from users relating to channel change can be supported.

As described above, a digital broadcasting receiver according to the invention has a configuration which can support diverse requests of users in channel change, for example, in the case where the current channel is changed from one channel to another channel when a commercial message is broadcast on the one channel on which a program is being watched. Accordingly, there is an advantage that the will of any user can be supported delicately when various processings involved in the channel changed are carried out.

What is claimed is:

1. A digital broadcasting receiver for selecting and watching one channel from a received digital broadcasting wave including a plurality of channels, comprising:
   a channel changing section that changes a current watching channel from the one channel to another channel;
   a measuring section that measures a watching time in which a user watches the another channel as the current watching channel;
   an operation section, manually or voice operated by the user, that returns the current watching channel from the another channel to the one channel after (1) the measuring section measures a predetermined time and (2) the user enters a manual or voice operated instruction to return the current watching channel to the one channel; and
   a recording section that causes to be recorded a program broadcast on the one channel at least during a period in which the current channel is the another channel.

2. The digital broadcasting receiver according to claim 1, further comprising a warning section that notifies the user with a warning when the operation section returns the current watching channel from the another channel to the one channel.

3. The digital broadcasting receiver according to claim 2, wherein the warning section is one of an output section for outputting sound and a display section for displaying at least one of character and graphic information.

4. The digital broadcasting receiver according to claim 2, wherein the warning section is a second display section that changes a color of at least one of character and graphic information, which is displayed on a display, from a normal display state.

5. The digital broadcasting receiver according to claim 1, wherein foreground color of a display is changed stepwise when the operation section is not operated for the predetermined time.

6. A digital broadcasting receiver for selecting and watching one channel from a received digital broadcasting wave including a plurality of channels, comprising:
   a channel changing section that changes a current watching channel from the one channel to another channel;
   a measuring section that measures a watching time in which a user watches the another channel as the current watching channel;
   an operation section, manually or voice operated by the user, that returns the current watching channel from the another channel to the one channel after (1) the measuring section measures a predetermined time and (2) the user enters a manual or voice operated instruction to return the current watching channel to the one channel;

a detecting section that detects a commercial message;

an instruction section that instructs the broadcasting receiver to change the current watching channel from the one channel to the another channel on which a commercial message is not broadcasted, when the detecting section detects that a commercial message is broadcasted on the one channel; and a recording section that causes to be recorded a program broadcast on the one channel.

7. The digital broadcasting receiver according to claim 6, further comprising an automatic-changing determination section that determines whether to change the current watching channel to the another channel on which the commercial message is not broadcasted when the detecting section detects that the commercial message is broadcasted on the one channel, which the user watches.

8. The digital broadcasting receiver according to claim 6, further comprising a returning section that returns the current watching channel from the another channel to the one channel when the detecting section detects that the commercial message is not broadcasted on the one channel.

9. The digital broadcasting receiver according to claim 1, further comprising an instruction section that instructs the digital broadcasting receiver to select and watch the another channel continuously as the current watching channel 1.

10. A digital broadcasting receiver for selecting and watching one channel from a received digital broadcasting wave including a plurality of channels, comprising:

a channel changing section that changes a current watching channel from the one channel to the another channel;

a recording section that causes to be recorded a program broadcast on the one channel;

a measuring section that measures a watching time in which a user watches the another channel as the current watching channel;

an operating section that returns the current watching channel from the another channel to the one channel after the measuring section measures a predetermined time;

a returning section that returns the current watching channel from the another channel to the one channel after watching the another channel; and an automatic reproducing section that automatically and retroactively reproduces a portion, which has been broadcasted on the one channel and has not been watched, when the current watching channel is returned to the one channel.

11. The digital broadcasting receiver according to claim 1, further comprising:

a returning section that returns the current watching channel from the another channel to the one channel after watching the another channel; and a reproduction instructing section that instructs the recording section to retroactively reproduce a portion, which has been broadcasted on the one channel and has not been watched, when the current watching channel is returned to the one channel.

12. The digital broadcasting receiver according to claim 1, further comprising:

a returning section that returns the current watching channel from the another channel to the one channel after watching the another channel; and a reproduction determining section that determines whether to automatically and retroactively reproduce a portion, which has been broadcasted on the one channel and has not been watched, when the current watching channel is returned to the one channel.

13. The digital broadcasting receiver according to claim 10, wherein the portion, which has been broadcasted on the one channel and has not been watched, is retroactively reproduced for a reproduction time; and wherein the reproduction time is set as an initial value in advance.

14. The digital broadcasting receiver according to claim 10, further comprising a setting section that sets a reproduction time, wherein the portion, which has been broadcasted on the one channel and has not been watched, is retroactively reproduced for the reproduction time.

15. A digital broadcasting receiver for selecting and watching one channel from a received digital broadcasting wave including a plurality of channels, comprising:

a detecting section that detects a commercial message;

an instruction section that instructs the digital broadcasting receiver to change a current watching channel from the one channel to another channel on which a commercial message is not broadcasted, when the detecting section detects that a commercial message is broadcasted on the one channel;

a measuring section that measures a watching time in which a user watches the another channel as the current watching channel;

an operation section that returns the current watching channel from the another channel to the one channel after the measuring section measures a predetermined time; and an automatic reproducing section that automatically and retroactively reproduces a portion, which has been broadcasted on the one channel and has not been watched, when the current watching channel is returned to the one channel.

* * * * *